US012771400B2

(12) United States Patent
Ahmad et al.

(10) Patent No.: US 12,771,400 B2
(45) Date of Patent: Oct. 20, 2026

(54) OSCILLATOR LEAKAGE CALIBRATION

(71) Applicant: Qualcomm Incorporated, San Diego, CA (US)

(72) Inventors: Waqas Ahmad, San Diego, CA (US); Chinmaya Mishra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/470,245

(22) Filed: Sep. 19, 2023

(65) Prior Publication Data

US 2025/0096839 A1 Mar. 20, 2025

(51) Int. Cl.
*H04B 1/525* (2015.01)
*H04B 1/04* (2006.01)
*H04B 17/11* (2015.01)

(52) U.S. Cl.
CPC ........... *H04B 1/525* (2013.01); *H04B 1/0475* (2013.01); *H04B 17/11* (2015.01)

(58) Field of Classification Search
CPC ...... H04B 1/525; H04B 1/0475; H04B 17/11; H03C 2200/0041; H03D 2200/0019; H03D 2200/0043; H03D 2200/0045; H03D 2200/009; H03D 7/1441; H03D 7/1458; H03D 7/1433
See application file for complete search history.

(56) References Cited

U.S. PATENT DOCUMENTS

| | | | | |
|---|---|---|---|---|
| 7,358,885 | B2 | 4/2008 | Maxim et al. | |
| 7,521,981 | B2 * | 4/2009 | Ng | H03D 7/165 455/333 |
| 7,660,563 | B2 * | 2/2010 | Gehring | H03D 7/1441 455/114.2 |
| 8,498,598 | B2 | 7/2013 | Basaran | |
| 2006/0094395 | A1 | 5/2006 | Lee et al. | |
| 2007/0069928 | A1 | 3/2007 | Gehring et al. | |

(Continued)

FOREIGN PATENT DOCUMENTS

| | | | |
|---|---|---|---|
| CN | 110662977 | B | 10/2022 |
| EP | 0951138 | A1 | 10/1999 |

OTHER PUBLICATIONS

Giannini V., et al., "A 2-mm 0.1-5 GHz Software-Defined Radio Receiver in 45-nm Digital CMOS", IEEE Journal of Solid-State Circuits, vol. 44, No. 12, Dec. 2009, pp. 3486-3498.

(Continued)

*Primary Examiner* — Curtis A Kuntz
(74) *Attorney, Agent, or Firm* — Smith Temple Blaha LLP

(57) ABSTRACT

An apparatus is disclosed for oscillator leakage calibration. The apparatus includes a mixer circuit and calibration circuitry. The mixer circuit has a first stage including at least one transistor coupled between a mixer input and a mixer output and a second stage including one or more transistors coupled between the at least one transistor and the mixer output. The mixer circuit also has tuning circuitry coupled to the at least one transistor. The calibration circuitry includes at least one resistor coupled between a power distribution node and at least one mixer node, with the at least one mixer node coupled between the at least one transistor and the one or more transistors, and at least one switch coupled between the power distribution node and the at least one mixer node. The calibration circuitry also includes controller circuitry coupled between the mixer node and the tuning circuitry.

21 Claims, 10 Drawing Sheets

(56) References Cited

U.S. PATENT DOCUMENTS

| | | | |
|---|---|---|---|
| 2009/0179695 A1 | 7/2009 | Siprak et al. | |
| 2009/0203347 A1 | 8/2009 | Kaczman et al. | |
| 2011/0142093 A1 | 6/2011 | De Rosa | |
| 2013/0039438 A1 | 2/2013 | Oliaei et al. | |
| 2014/0079157 A1* | 3/2014 | Simmonds | H04B 1/30 375/316 |
| 2022/0045646 A1 | 2/2022 | Dey et al. | |
| 2024/0162921 A1* | 5/2024 | Chakraborty | H04B 1/0028 |
| 2024/0178795 A1 | 5/2024 | Abouzied et al. | |
| 2024/0275425 A1* | 8/2024 | Elsayed | H04B 1/525 |

OTHER PUBLICATIONS

International Search Report and Written Opinion—PCT/US2024/043844—ISA/EPO—Feb. 3, 2025.

Hsia K., "TI Designs High Speed: CerTIfied Design TSW308x Wideband Digital to RF Transmit Solution", Texas Instruments, Sep. 2013, 31 pages.

Lee C.P., et al., "A Highly Linear Direct-Conversion Transmit Mixer Transconductance Stage with Local Oscillation Feedthrough and I/Q Imbalance Cancellation Scheme", 2006 IEEE International Solid-State Circuits Conference, Feb. 6-9, 2006, 10 Pages.

O'Sullivan C., et al., "Carrier Leak Calibration Scheme on a 0.18μm Transmitter", Jun. 2010, 6 Pages.

O'Sullivan C., "Local Oscillator Feedthrough Suppression Using On-Chip Calibration Techniques", Dec. 23, 2021, 5 pages.

Pang J., et al., "A 128-QAM 60GHz CMOS Transceiver for IEEE802.11ay with Calibration of LO Feedthrough and I/Q Imbalance", 2017 IEEE International Solid-State Circuits Conference, Session 24, Wireless Receivers and Synthesizers, 24.9, Feb. 2017, pp. 424-426.

Wang Y., et al., "A 39-GHz 64-Element Phased-Array Transceiver with Built-In Phase and Amplitude Calibrations for Large-Array 5G NR in 65-nm CMOS", Apr. 2020, pp. 1-21.

Giannini V., et al., "A 2-mm2 0.1-5 GHZ Software-Defined Radio Receiver in 45-nm Digital CMOS", IEEE Journal of Solid-state Circuits, IEEE, USA, vol. 44, No. 12, Dec. 31, 2009, pp. 3486-3498, XP011285559, figure 8.

* cited by examiner

200

OSCILLATOR LEAKAGE CALIBRATION

TECHNICAL FIELD

This disclosure relates generally to signal communication or signal processing using an electronic device and, more specifically, to circuitry calibration to counteract leakage from an oscillator coupled to a mixer circuit.

BACKGROUND

Electronic devices include traditional computing devices such as desktop computers, notebook computers, smartphones, wearable devices like a smartwatch, internet servers, and so forth. Electronic devices also include other types of computing devices such as personal voice assistants (e.g., smart speakers), wireless access points or routers, thermostats and other automated controllers, robotics, automotive electronics, devices embedded in other machines like refrigerators and industrial tools, Internet of Things (IoT) devices, medical devices, and so forth. These various electronic devices provide services relating to productivity, communication, social interaction, security, health and safety, remote management, entertainment, transportation, and information dissemination. Thus, electronic devices play crucial roles in modern society.

Many of the services provided by electronic devices in today's interconnected world depend at least partly on electronic communications. Electronic communications can include, for example, those exchanged between two or more electronic devices using wireless or wired signals that are transmitted over one or more networks, such as the Internet, a Wi-Fi® network, or a cellular network. Electronic communications can therefore include wireless or wired transmissions and receptions. To transmit and receive communications, an electronic device can use a transceiver, such as a wireless transceiver that is designed for wireless communications.

Some electronic communications can thus be realized by propagating signals between two wireless transceivers at two different electronic devices. For example, using a wireless transmitter, a smartphone can transmit a wireless signal to a base station over the air as part of an uplink communication to support mobile services. Using a wireless receiver, the smartphone can receive a wireless signal that is transmitted from the base station via the air medium as part of a downlink communication to enable mobile services. With a smartphone, for instance, mobile services can include making voice and video calls, participating in social media interactions, sending messages, watching movies, sharing videos, performing searches, using map information or navigational instructions, finding friends, engaging in location-based services generally, transferring money, obtaining another service like a car ride, and so forth.

Many mobile and communication-based services depend at least partly on the transmission or reception of wireless signals between two or more electronic devices. Consequently, researchers, electrical engineers, and other designers of electronic devices strive to develop wireless transceivers that can use wireless signals effectively to provide these and other mobile services.

SUMMARY

Local oscillator feedthrough (LOFT) refers to an oscillator signal that "leaks" through a mixer into a communication chain and adversely impacts downstream signals. This document describes devices and techniques that counteract such oscillator signal leakage. To transmit or receive wireless signals, a wireless interface device can include a communication chain (e.g., a transmit or receive chain) that processes a propagating signal. This processing may entail frequency conversion using a mixer. A mixer converts between frequencies using a local oscillator signal from a local oscillator (LO). In described examples, a mixer circuit includes a mixer and tuning circuitry. The tuning circuitry applies a calibration signal, such as a bias voltage, to the mixer to counteract LOFT. To determine the calibration signal, at least one transconductance transistor of the mixer can be analyzed in the direct-current (DC) domain with one or more mixer switching transistors turned off. A DC-bias current is routed through the transconductance transistor, and calibration circuitry measures an indication of the DC-bias current using a voltage across at least one resistor. Based on the measured DC-bias current, the calibration circuitry uses the tuning circuitry to adjust at least one bias voltage to reduce a DC current offset, which corresponds to a difference between currents flowing through plus and minus transconductance transistors. These techniques can be implemented in multiple different ways. For example, the bias voltage can be coupled to a back gate or a front gate of a transconductance transistor. Additionally or alternatively, two resistors can be employed with respective voltages being compared, or a voltage from one resistor may be compared to a reference voltage. Thus, the calibration circuitry can adjust the tuning circuitry to at least reduce the DC current offset to counteract the oscillator leakage. In these manners, the LOFT can be reduced without relying on expensive external testing equipment and by instead using onboard calibration circuitry. These and other implementations are described herein.

In an example aspect, an apparatus for oscillator leakage calibration is disclosed. The apparatus includes a mixer circuit and calibration circuitry. The mixer circuit includes a first stage, a second stage, and tuning circuitry. The first stage includes at least one transistor coupled between a mixer input and a mixer output. The second stage includes one or more transistors coupled between the at least one transistor of the first stage and the mixer output, with the one or more transistors coupled between a local oscillator signal input and the mixer output. The tuning circuitry is coupled to the at least one transistor of the first stage. The calibration circuitry includes at least one resistor, at least one switch, and controller circuitry. The at least one resistor is coupled between a power distribution node and at least one mixer node, with the at least one mixer node coupled between the at least one transistor of the first stage and the one or more transistors of the second stage. The at least one switch is coupled between the power distribution node and the at least one mixer node. The controller circuitry is coupled between the at least one mixer node and the tuning circuitry.

In an example aspect, an apparatus for oscillator leakage calibration is disclosed. The apparatus includes a mixer circuit and calibration circuitry. The mixer circuit includes a first stage and a second stage. The first stage includes at least one transistor coupled between a mixer input and a mixer output. The second stage includes one or more transistors coupled between the at least one transistor of the first stage and the mixer output. The mixer circuit also includes means for tuning the at least one transistor of the first stage. The calibration circuitry includes at least one resistor and at least one switch. The at least one resistor is coupled between a power distribution node and at least one mixer node, with the at least one mixer node coupled between the at least one transistor of the first stage and the one or more transistors of the second stage. The at least one switch is coupled in series with the at least one resistor between the power distribution node and the at least one mixer node. The calibration circuitry also includes means for controlling the means for tuning based on at least one voltage associated with the at least one resistor.

In an example aspect, a method for mixer calibration or calibrating a mixer circuit to counteract oscillator leakage is disclosed. The method includes closing a plus switch to connect at least one resistor to a plus mixer node coupled between a plus transistor of a first stage of a mixer circuit and a second stage of the mixer circuit. The method also includes measuring a plus voltage corresponding to the plus transistor of the first stage of the mixer circuit using the at least one resistor and opening the plus switch to disconnect the at least one resistor from the plus mixer node. The method additionally includes closing a minus switch to connect the at least one resistor to a minus mixer node coupled between a minus transistor of the first stage of the mixer circuit and the second stage of the mixer circuit. The method also includes measuring a minus voltage corresponding to the minus transistor of the first stage of the mixer circuit using the at least one resistor. The method further includes adjusting at least one bias voltage applied to at least one of the plus transistor or the minus transistor of the first stage of the mixer circuit based on the plus voltage and the minus voltage.

In an example aspect, an apparatus for oscillator leakage calibration is disclosed. The apparatus includes a communication chain. The communication chain includes a mixer, at least one resistor, a plus switch, and a minus switch. The mixer includes a plus transistor having a plus channel terminal and a plus gate terminal. The mixer also includes a minus transistor having a minus channel terminal and a minus gate terminal. The plus switch is coupled in series with the at least one resistor between the plus channel terminal of the plus transistor and a power distribution node. The plus node is coupled between the plus switch and the at least one resistor. The minus switch is coupled in series with the at least one resistor between the minus channel terminal of the minus transistor and the power distribution node. The minus node is coupled between the minus switch and the at least one resistor. The communication chain also includes at least one bias voltage generator and calibration circuitry. The at least one bias voltage generator is coupled to the plus gate terminal of the plus transistor and the minus gate terminal of the minus transistor. The calibration circuitry is coupled between the plus node and the at least one bias voltage generator and between the minus node and the at least one bias voltage generator.

DETAILED DESCRIPTION

Introduction and Overview

Figure 1:
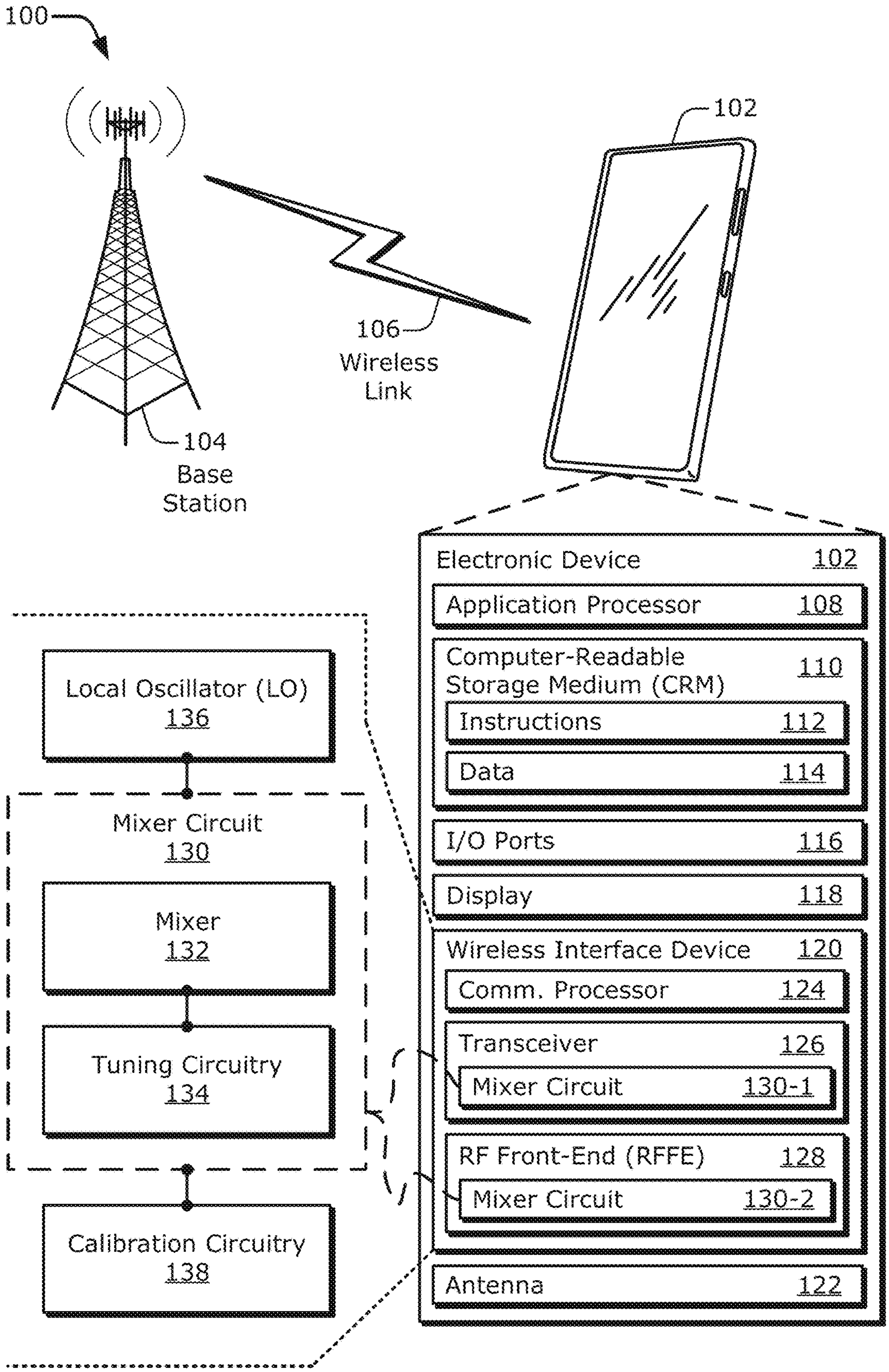
FIG. 1 illustrates an environment with an example electronic device that has a wireless interface device, which includes an example mixer circuit and corresponding calibration circuitry.

To facilitate transmission and reception of wireless signals, an electronic device can use a wireless interface device that includes a wireless transceiver and/or a radio-frequency (RF) front-end. Electronic devices communicate with wireless signals using electromagnetic (EM) signaling at various frequencies that exist on a portion of the EM spectrum. These wireless signals may travel between two electronic devices while oscillating at a particular frequency, such as a kilohertz (kHz) frequency, a megahertz. (MHz) frequency, or a gigahertz (GHz) frequency. The EM spectrum is, however, a finite resource that limits how many signals can be simultaneously communicated in any given spatial area. There are already billions of electronic devices that use this limited resource. To enable a greater number of simultaneous communications using EM signaling, the finite EM spectrum is shared among electronic devices. The EM spectrum can be shared using, for instance, frequency-division multiplexing (FDM) techniques and/or time-division multiplexing (TDM) techniques.

Techniques for FDM or TDM can entail separating the EM spectrum into different frequency bands and constraining communications to occur within an assigned frequency band. EM signals in different frequency bands can be communicated at the same time in a same area without significantly interfering with each other. To transmit a signal within a target frequency band, a transmit chain of a wireless interface device can apply a mixer to the signal to upconvert a relatively lower frequency to reach the target frequency band. To recover information carried by a signal that is received in the target frequency band, a receive chain of the wireless interface device can apply a mixer to the received signal to down-convert from the target frequency band to a lower frequency to facilitate further processing.

To perform frequency conversion, a mixer operates in conjunction with a local oscillator (LO) that produces a local oscillator signal (LO signal). The mixer "combines" (e.g., multiplies) an input signal with the LO signal to produce an output signal. The input signal carries information, and the output signal continues to carry the information after the signal mixing is performed to convert the frequency. The mixer can be configured such that the output signal has a higher frequency than the input signal for frequency up-conversion in a transmit chain as part of processing a signal to be transmitted. Alternatively, the mixer can be configured such that the output signal has a lower frequency than the input signal for frequency down-conversion in a receive chain as part of processing a received signal. The frequency of the output signal is dependent, at least partly, on a frequency of the LO signal provided by the local oscillator.

To provide a purer signal for downstream processing after frequency conversion at a mixer, little if any of the LO signal should "leak" through the mixer independently of the information-carrying output signal. Local oscillator feedthrough (LOFT) refers to a LO signal that "leaks" through a mixer into a communication chain (e.g., a transmit chain or a receive chain) and adversely impacts downstream signal processing. LOFT can limit throughput of the system. For example, LOFT can increase an error vector magnitude (EVM) parameter, especially with wideband signaling. The EVM parameter measures how accurately a signal being transmitted or received matches an intended signal in terms of timing, phase, and/or magnitude as represented by a constellation diagram.

For transmission operations in particular, LOFT can decrease effective radiated power (ERP), which can be especially detrimental in systems that utilize beamforming. Further, for a mmW massive phase-array system, LOFT is particularly impactful because the "leaked" power on the field can potentially add together across elements of an antenna array. This summed or combined "leaked" power can exceed an emission specification of a 3GPP standard, which may be approximately −13 decibels-per-meter (dBm)/MHz, depending on the range. This emission constraint results in a relatively stringent LOFT specification for each antenna element, given that each element is to be scaled down by 10*log (N), where "N" is the number of massive phase-array elements which can be turned on simultaneously.

To further utilize the finite EM spectrum more efficiently, some wireless interface devices implement beamforming. Beamforming focuses a transmission or reception in a targeted direction to facilitate spatial sharing of EM signals and/or to increase usable signal range. To implement beamforming, a wireless interface device is coupled to an antenna array having multiple antenna elements. To interface with the multiple antenna elements, the wireless interface device includes multiple communication chains. Employing multiple communication chains also makes meeting LOFT specifications increasingly more difficult.

In one approach, an external or additional filter can be used to filter out LO signal leakage at, e.g., an output of a power amplifier of a transmit chain. This filtering approach, however, creates excessive loss for transmission signal generation and emanation and for reception signal acquisition and processing. This loss limits performance and appreciably increases module cost and design complexity. Notably, LOFT is often generated, at least in part, by a mismatch in the local oscillator or in the transconductance stage of a mixer. These mismatches are intensifying in terms of both an amount of difference between two or more components and a frequency of occurrence as process scaling reaches several tens of nanometers (nm) and below.

In another approach, calibration to combat LOFT can be performed using external radio-frequency (RF) equipment during manufacturing and testing. But this approach is associated with several problems. First, automated testing equipment (ATE) is expensive. Second, as frequencies increase to utilize more of the limited EM spectrum, signal processing and transmission is reaching millimeter wave (mmW) frequencies. These mmW frequencies can include frequencies above approximately 20 gigahertz (GHz), and LOFT can occur at such mmW frequencies, as well as other frequencies. ATE that operates at mmW frequencies is not currently available. If or when such ATE becomes available, the RF equipment used to capture spectrum at these frequencies during testing will introduce even greater production costs and time penalties due to the testing.

In an additional approach, a power detector (PDET) can be coupled to a point along a communication chain to obtain an indication of a propagating signal that includes at least a portion of the LOFT. The power detector, which may be on-chip, detects a power level of the propagating signal based on the indication and provides the detected power level to controller circuitry. The controller circuitry adjusts tuning circuitry for (e.g., an amount of current that is applied to) transistors of a mixer based on the detected power level. During calibration, the detected power level arises from a mixer that is receiving a positive-amplitude LO signal but a zero-amplitude information-carrying signal. Thus, the detected power level can substantially represent the LOFT. Accordingly, the controller circuitry can adjust the tuning circuitry to reduce the detected power level to reduce the LOFT.

This PDET approach entails a LO tone power being in a detectable range of the PDET. Due to the capabilities of power detectors, however, this approach may be ineffective for some apparatuses, such as customer premise equipment (CPE) or base station (BS) apparatuses. For example, if a threshold of a PDET is −20 dBm, the PDET approach may be effective for a user equipment (UE) environment with an output port having −20 dBm of LO tone power but ineffective for a CPE having a −30 dBm of LO tone power at the output port and a BS having a −45 dBm of LO tone power at the outport port. Further, for increased effectiveness, the total noise or combined power of other tones should be appreciably less than the LO power because the PDET alone cannot discern between different frequency components.

In yet another approach involving calibration to combat LOFT, an end-to-end (e2e) loopback scheme can be employed. With such an e2e loopback scheme, a receive chain is used to measure a transmit signal, and the measured signal is routed back through the receive chain for analysis. The e2e loopback scheme, however, can subject the measured signal to the non-idealities of a down-conversion RX mixer, and these non-idealities make signal analysis problematic.

For alternative approaches, this document describes devices and techniques that counteract local oscillator leakage without needing to rely on a PDET or external equipment to capture RF emanations. The described devices and techniques can thus reduce the production costs for wireless interface devices, including those operating at mmW frequencies. The techniques and devices can also enable calibration for reducing local oscillator leakage to be performed with on-board equipment, including after an electronic device has been deployed in the field.

Generally, a mixer circuit of a communication chain, such as a transmit chain, can perform frequency conversion using a LO signal from a local oscillator. In example implementations, the mixer circuit includes a mixer and tuning circuitry. The tuning circuitry applies a calibration signal to the mixer to counteract LOFT, which may otherwise propagate along the communication chain. To determine the calibration signal, a portion of the circuitry of the mixer can be operated. More specifically, switching transistors of the mixer can be turned off, and transconductance amplifiers of the mixer can be analyzed in a direct-current domain (DC domain) during a calibration procedure.

In example operations, calibration circuitry is coupled between at least one mixer node of the mixer and the tuning circuitry of the mixer circuit. The calibration circuitry measures a voltage corresponding to the mixer node, with the voltage indicative of a current flowing through a transconductance amplifier of the mixer. A controller or controller circuitry of the calibration circuitry provides a control signal to the tuning circuitry to adjust the voltage at the mixer node. The tuning circuitry can include at least one bias voltage generator that is coupled to a gate of a transconductance transistor of the mixer. The transistor gate may correspond to a front-gate terminal or a back-gate terminal, which is also referred to as a bulk terminal, of the transconductance transistor. In a differential environment, the at least one bias voltage generator can further be coupled to a gate of a plus transconductance transistor or a minus transconductance transistor, including to the plus and minus transconductance transistors in a permitted "exclusive-or" interpretation of the word "or."

Thus, with differential signaling, the mixer includes a plus transconductance transistor and a minus transconductance transistor. A current offset, or current mismatch, between plus and minus currents respectively flowing through the plus and minus transconductance transistors can contribute to oscillator leakage. Reducing the current offset can reduce the oscillator leakage. Accordingly, the controller can cause at least one of the plus and minus currents to be changed to reduce the current offset to reduce LOFT.

The calibration circuitry can include at least one resistor that is coupled between the mixer node and a power distribution node, such as a supply voltage node. In a differential environment, the at least one resistor may be coupled to a plus mixer node and a minus mixer node. In some cases, a resistor is coupled to the plus and minus mixer nodes with respective plus and minus switches, and a comparator is used to analyze the voltages at these mixer nodes using the resistor. In other cases, with a plus resistor and a minus resistor, the plus resistor is coupled to the plus mixer node via a plus switch, and the minus resistor is coupled to the minus mixer node via a minus switch. An analog-to-digital converter (ADC) may be used to analyze the voltages at the plus and minus mixer nodes. More specifically, the controller circuitry can analyze a voltage difference between the two mixer nodes and thus indirectly analyze a current difference between plus and minus currents respectively flowing through plus and minus transconductance transistors.

The controller circuitry may establish one or more settings, such as by storing at least one value in a register, based on the calibration procedure. The settings can control a bias voltage provided by the bias voltage generator to a gate terminal of the plus transconductance transistor or the minus transconductance transistor to reduce a voltage difference between the plus and minus mixer nodes. By reducing the difference between the voltages at the plus and minus mixer nodes, the current offset between the plus and minus transconductance transistors is likewise reduced. By reducing the current offset between plus and minus transconductance transistors in the mixer, oscillator leakage is reduced. These and other implementations are described herein.

Description Examples

FIG. 1 illustrates an example environment 100 with an electronic device 102 that has a wireless interface device 120, which includes at least one example mixer circuit 130 and calibration circuitry 138. This document describes example implementations of the mixer circuit 130 and corresponding calibration circuitry 138, which may be parts of a radio-frequency front-end (RFFE), a transceiver, a communication processor, and so forth of an apparatus. In the environment 100, the electronic device 102 communicates with a base station 104 through a wireless link 106.

In FIG. 1, the example electronic device 102 is depicted as a smartphone. The electronic device 102, however, may be implemented as any suitable computing or other electronic device. Examples of an apparatus that can be realized as an electronic device 102 include a cellular base station, broadband router, access point, cellular or mobile phone, gaming device, navigation device, media device, laptop computer, desktop computer, tablet computer, and server computer. Other examples of an apparatus that can be realized as an electronic device 102 include a network-attached storage (NAS) device, smart appliance, vehicle-based communication system, Internet of Things (IoT) device, sensor or security device, asset tracker, fitness management device, wearable device such as intelligent glasses or smartwatch, wireless power device (transmitter or receiver), medical device, and so forth. An electronic device 102 may be referred to with different terminology, such as a user equipment (UE), a customer premises equipment (CPE), or a cell site modem (CSM).

The base station 104 communicates with the electronic device 102 via the wireless link 106, which may be implemented as any suitable type of wireless link that carries a communication signal. Although depicted as a base station tower of a cellular radio network, the base station 104 may represent or be implemented as another device, such as a satellite, terrestrial broadcast tower, access point, CPE, CSM, peer-to-peer device, mesh network node, fiber optic line interface, another electronic device as described above generally, and so forth. Hence, the wireless link 106 can extend between the electronic device 102 and the base station 104 in any of various manners.

The wireless link 106 can include a downlink of data or control information communicated from the base station 104 to the electronic device 102. The wireless link 106 can also include an uplink of other data or control information communicated from the electronic device 102 to the base station 104. The wireless link 106 may be implemented using any suitable wireless communication protocol or standard. Examples of such protocols and standards include a 3$^{rd}$ Generation Partnership Project (3GPP) Long-Term Evolution (LTE) standard, such as a 4th Generation (4G), a 5$^{th}$ Generation (5G), or a 6$^{th}$ Generation (6G) cellular standard; an IEEE 802.11 standard, such as 802.11g, ac, ax, ad, aj, or ay standard (e.g., Wi-Fi® 6 or WiGig®); an IEEE 802.16 standard (e.g., WiMAX®); a Bluetooth® standard; an ultra-wideband (UWB) standard (e.g., IEEE 802.15.4); and so forth. In some implementations, the wireless link 106 may provide power wirelessly, and the electronic device 102 or the base station 104 may comprise a power source or a power sink.

As shown for some implementations, the electronic device 102 can include at least one application processor 108 and at least one computer-readable storage medium 110 (CRM 110). The application processor 108 may include any type of processor, such as a central processing unit (CPU) or a multi-core processor, that is configured to execute processor-executable instructions (e.g., code) stored by the CRM 110. The CRM 110 may include any suitable type of data storage media, such as volatile memory (e.g., random-access memory (RAM)), non-volatile memory (e.g., Flash memory), optical media (e.g., a disc), magnetic media (e.g., a disk or tape), and so forth. In the context of this disclosure, the CRM 110 is implemented to store instructions 112, data 114, and other information of the electronic device 102, and thus the CRM 110 does not include transitory propagating signals or carrier waves.

The electronic device 102 may also include one or more input/output ports 116 (I/O ports 116) and at least one display 118. The I/O ports 116 enable data exchanges or interaction with other devices, networks, or users. The I/O ports 116 may include serial ports (e.g., universal serial bus (USB®) ports), parallel ports, audio ports, infrared (IR) ports, camera or other sensor ports, and so forth. The display 118 can be realized as a display screen or a projection that presents graphical images provided by other components of the electronic device 102, such as a user interface (UI) associated with an operating system, program, or application. Alternatively or additionally, the display 118 may be implemented as a display port or virtual interface through which graphical content of the electronic device 102 is communicated or presented.

The electronic device 102 further includes at least one wireless interface device 120 and at least one antenna 122. The example wireless interface device 120 provides connectivity to respective networks and peer devices via a wireless link, which may be configured similarly to or differently from the wireless link 106. The wireless interface device 120 may facilitate communication over any suitable type of wireless network, such as a wireless local area network (LAN) (WLAN), wireless personal-area-network (PAN) (WPAN), peer-to-peer (P2P) network, mesh network, cellular network, wireless wide-area-network (WAN) (WWAN), and/or navigational network (e.g., the Global Positioning System (GPS) of North America or another Satellite Positioning System (SPS) or Global Navigation Satellite System (GNSS)). In the context of the example environment 100, the electronic device 102 can communicate various data and control information bidirectionally with the base station 104 via the wireless interface device 120. The electronic device 102 may, however, communicate directly with other peer devices, an alternative wireless network, and the like. Also, as described above, an electronic device 102 may alternatively be implemented as a base station 104, an access point, or another apparatus as set forth herein.

As shown in FIG. 1, the wireless interface device 120 can include at least one communication processor 124, at least one transceiver 126, and at least one radio-frequency front-end 128 (RFFE 128). These components process data information, control information, and signals associated with communicating information for the electronic device 102 via the antenna 122. The communication processor 124 may be implemented as at least part of a system-on-chip (SoC), as a modem processor, or as a baseband radio processor (BBP) that enables a digital communication interface for data, voice, messaging, or other applications of the electronic device 102. The communication processor 124 can include a digital signal processor (DSP) or one or more signal-processing blocks (not shown) for encoding and modulating data for transmission and for demodulating and decoding received data. Additionally, the communication processor 124 may also manage (e.g., control or configure) aspects or operation of the transceiver 126, the RF front-end 128, and other components of the wireless interface device 120 to implement various communication protocols or communication techniques.

In some cases, the application processor 108 and the communication processor 124 can be combined into one module or integrated circuit (IC), such as an SoC. Regardless, the application processor 108, the communication processor 124, or a processor generally can be operatively coupled to one or more other components, such as the CRM 110 or the display 118, to enable control of, or other interaction with, the various components of the electronic device 102. For example, at least one processor 108 or 124 can present one or more graphical images on a display screen implementation of the display 118 based on one or more wireless signals communicated (e.g., transmitted or received) via the at least one antenna 122 using components of the wireless interface device 120. Further, the application processor 108 or the communication processor 124, including a combination thereof, can be realized using digital circuitry that implements logic or functionality that is described herein. Additionally, the communication processor 124 may also include or be associated with a memory (not separately depicted) to store data and processor-executable instructions (e.g., code), such as the same CRM 110 or another CRM.

As shown, the wireless interface device 120 can include at least one mixer circuit 130, which is described below. More specifically, the transceiver 126 can include at least one mixer circuit 130-1, or the RF front-end 128 can include at least one mixer circuit 130-2 (including both components can have at least one mixer circuit 130 in accordance with an optional, but permitted herein, "inclusive-or" interpretation of the word "or"). The transceiver 126 can also include circuitry and logic for filtering, switching, amplification, channelization, frequency translation, and so forth.

Frequency translation functionality may include an up-conversion or a down-conversion of frequency that is performed through a single conversion operation (e.g., with a direct-conversion architecture) or through multiple conversion operations (e.g., with a superheterodyne architecture). The transceiver 126 can perform such frequency conversion (e.g., frequency translation) by using the mixer circuit 130-1 and an associated local oscillator 136. Generally, the transceiver 126 can include filters, switches, amplifiers, mixers, and so forth for routing and conditioning signals that are transmitted or received via the antenna 122.

In addition to the mixer circuit 130-1, the transceiver 126 can include an analog-to-digital converter (ADC) or a digital-to-analog converter (DAC) (not shown in FIG. 1). In operation, an ADC can convert analog signals to digital signals, and a DAC can convert digital signals to analog signals. Generally, an ADC or a DAC can be implemented as part of the communication processor 124, as part of the transceiver 126, or separately from both (e.g., as another part of an SoC, as part of the application processor 108, or as part of the RF front-end 128).

Figure 2:
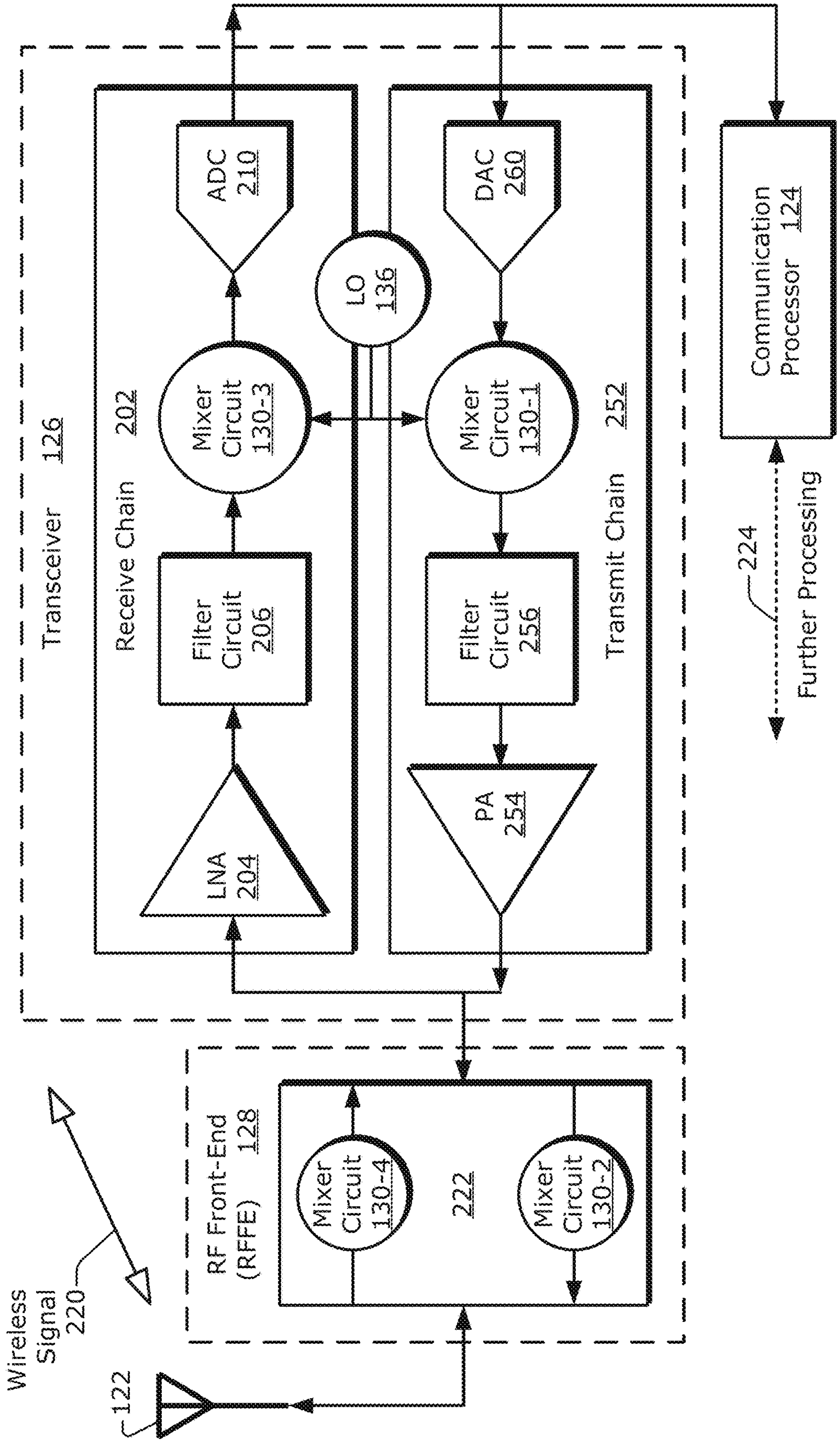
FIG. 2 is a schematic diagram illustrating an example radio-frequency (RF) front-end and an example transceiver that can each include at least one mixer circuit.

The components or circuitry of the transceiver 126 can be implemented in any suitable fashion, such as with combined transceiver logic or separately as respective transmitter and receiver entities. In some cases, the transceiver 126 is implemented with multiple or different sections to implement respective transmitting and receiving operations (e.g., with at least partially separate transmit and receive chains as depicted in FIG. 2). Although not shown in FIG. 1, the transceiver 126 may include logic to perform in-phase/ quadrature (I/Q) operations, such as synthesis, phase correction, modulation, demodulation, and the like.

The RF front-end 128 can also include one or more mixers—such as the mixer circuit 130-2—one or more filters, one or more switches, or one or more amplifiers for conditioning signals received via the antenna 122 or for conditioning signals to be transmitted via the antenna 122. The RF front-end 128 may also include a local oscillator 136, a phase shifter (PS), a peak detector, a power meter, a gain control block, an antenna tuning circuit, an N-plexer, a balun, and the like. Configurable components of the RF front-end 128, such as some phase shifters, an automatic gain controller (AGC), or a tunable version of the mixer circuit 130-2, may be controlled by the communication processor 124 to implement communications in various modes, with different frequency bands, using beamforming, or with improved performance. In some implementations, the antenna 122 is implemented as at least one antenna array that includes multiple antenna elements. Thus, as used herein, an "antenna" can refer to at least one discrete or independent antenna, to at least one antenna array that includes multiple antenna elements, or to a portion of an antenna array (e.g., an antenna element), depending on context or implementation.

In example implementations, the wireless interface device 120 includes at least one mixer circuit 130, at least one local oscillator 136 (LO 136), and at least one instance of calibration circuitry 138. The mixer circuit 130 is coupled to the local oscillator 136 and the calibration circuitry 138. These components may be separately or jointly positioned at the communication processor 124, the transceiver 126, the RF front-end 128, or a combination thereof, including by being distributed across two or more sections or parts of the wireless interface device 120. In FIG. 1, an example mixer circuit 130 is depicted as being part of a transceiver 126 as a mixer circuit 130-1, as being part of an RF front-end 128 as a mixer circuit 130-2, and so forth. Described implementations of a mixer circuit 130 can, however, additionally or alternatively be employed in other portions of the wireless interface device 120 or in other portions of the electronic device 102 generally. Further, each portion may include more than one mixer circuit 130.

As set forth above, a mixer circuit 130 can be included in an electronic device besides a cell phone, such as a base station 104 or wireless access point. Also, with a base station (or with a mobile phone or other electronic device that uses a superheterodyne architecture), a mixer for an, e.g., intermediate frequency (IF) section of a wireless interface device 120 may be realized using a mixer circuit 130 as described herein. Other electronic device apparatuses that can employ a mixer circuit 130 and corresponding calibration circuitry 138 include a laptop, communication hardware of a vehicle, a wireless access point, a wearable device, and so forth as described herein.

In example implementations, the mixer circuit 130 can include at least one mixer 132 and at least one instance of tuning circuitry 134. The mixer 132 is coupled to the tuning circuitry 134. Although certain components are shown as being part of an example mixer circuit 130 in FIG. 1, a given mixer circuit may have more, fewer, or different components. Examples of mixer circuits are described below with reference to FIGS. 4-9.

During regular or "mission" modes of operation, the local oscillator 136 feeds a LO signal to the mixer 132 of the mixer circuit 130. The LO signal can "leak" into other parts of the wireless interface device 120, such as along a communication chain (not shown in FIG. 1) of which the mixer 132 forms a part. To account for this oscillator leakage or LO feedthrough (LOFT), the calibration circuitry 138 controls the tuning circuitry 134 to provide one or more counteracting tuning signals, such as a bias voltage, to the mixer 132. The counteracting tuning signals can be determined during an initialization or "calibration" operational mode. Applying these tuning signals can reduce the LOFT to improve error-vector magnitude (EVM), effective radiated power (ERP), unwanted spurious emissions, and other wireless performance characteristics. Example approaches to calibration procedures are described below with reference to FIGS. 3-10. Next, however, this document describes example implementations of a transceiver and an RF front-end with reference to FIG. 2.

FIG. 2 is a schematic diagram of circuitry 200 illustrating an example RF front-end 128 and an example transceiver 126 that can each include at least one mixer circuit 130. FIG. 2 also depicts an antenna 122 and a communication processor 124. The communication processor 124 communicates one or more data signals to other components, such as the application processor 108 of FIG. 1, for further processing at 224 (e.g., for processing at an application level) for reception operations. For transmission operations, the communication processor 124 communicates one or more data signals from other components to the transceiver 126. As shown, the circuitry 200 can include a first mixer circuit 130-1, a second mixer circuit 130-2, a third mixer circuit 130-3, or a fourth mixer circuit 130-4, including one to four of such mixer circuits. The circuitry 200, however, may include a different quantity of mixers (e.g., more or fewer), may include mixers that are coupled together differently, may include mixers at different locations, may include mixers that are implemented as part of a frequency converter, and so forth.

As illustrated from left to right, in example implementations, the antenna 122 is coupled to the RF front-end 128, and the RF front-end 128 is coupled to the transceiver 126. The transceiver 126 is coupled to the communication processor 124. The example RF front-end 128 includes at least one signal propagation path 222. The at least one signal propagation path 222 can include at least one mixer circuit 130, such as the mixer circuit 130-2 and the mixer circuit 130-4. The example transceiver 126 includes at least one receive chain 202 (or receive path 202) and at least one transmit chain 252 (or transmit path 252). Although only one RF front-end 128, one transceiver 126, and one communication processor 124 are shown at the circuitry 200, an electronic device 102, or a wireless interface device 120 thereof, can include multiple instances of any or all such components. Also, although only certain components are explicitly depicted in FIG. 2 and are shown coupled together in a particular manner, the transceiver 126 or the RF front-end 128 may include other non-illustrated components (e.g., switches or diplexers), more or fewer components, differently coupled arrangements of components, and so forth.

In some implementations, the RF front-end 128 couples the antenna 122 to the transceiver 126 via the signal propagation path 222. In operation, the signal propagation path 222 carries a signal between the antenna 122 and the transceiver 126. During or as part of the signal propagation, the signal propagation path 222 conditions the propagating signal, such as with the mixer circuit 130-2 or the mixer circuit 130-4. This enables the RF front-end 128 to couple a wireless signal 220 from the antenna 122 to the transceiver 126 as part of a reception operation. The RF front-end 128 also enables a transmission signal to be coupled from the transceiver 126 to the antenna 122 as part of a transmission operation to emanate a wireless signal 220. Although not explicitly shown in FIG. 2, an RF front-end 128, or a signal propagation path 222 thereof, may include one or more other components, such as another mixer, a filter, an amplifier (e.g., a power amplifier (PA) or a low-noise amplifier (LNA)), an N-plexer, a phase shifter, a diplexer, one or more switches, and so forth.

In some implementations, the transceiver 126 can include at least one receive chain 202, at least one transmit chain 252, or at least one receive chain 202 and at least one transmit chain 252. From left to right, the receive chain 202 can include a low noise amplifier 204 (LNA 204), a filter circuit 206, the mixer circuit 130-3 for frequency down-conversion, and an ADC 210. The transmit chain 252 can include a power amplifier 254 (PA 254), a filter circuit 256, the mixer circuit 130-1 for frequency up-conversion, and a DAC 260. However, the receive chain 202 or the transmit chain 252 can include other components—for example, additional amplifiers or mixers, multiple filters, at least one transformer, one or more buffers, or at least one phase-locked loop—that are electrically or electromagnetically coupled anywhere along the depicted receive and transmit chains.

The receive chain 202 is coupled between the signal propagation path 222 of the RF front-end 128 and the communication processor 124—e.g., via the low-noise amplifier 204 and the ADC 210, respectively. The transmit chain 252 is coupled between the signal propagation path 222 and the communication processor 124—e.g., via the power amplifier 254 and the DAC 260, respectively. The transceiver 126 can also include at least one local oscillator 136 (LO 136) that is coupled to the mixer circuit 130-1 or the mixer circuit 130-3, including to both mixer circuits. The local oscillator 136 may be a portion of a synthesizer circuit (including one or more PLLs/VCOs and other circuitry) that may generate the local oscillator signal. For example, the transceiver 126 can include one local oscillator 136 for each transmit/receive chain pair, one local oscillator 136 per transmit chain and one local oscillator 136 per receive chain, multiple local oscillators 136 per transmit or receive chain, and so forth. Each of the mixer circuit 130-2 and the mixer circuit 130-4 of the RF front-end 128 may also be coupled to the same local oscillator 136 or to a different local oscillator (not shown in FIG. 2).

As depicted along a signal propagation direction for certain example implementations of the receive chain 202, the antenna 122 is coupled to the low noise amplifier 204 via the signal propagation path 222 and the mixer circuit 130-4 thereof, and the low noise amplifier 204 is coupled to the filter circuit 206. The filter circuit 206 is coupled to the mixer circuit 130-3, and the mixer circuit 130-3 is coupled to the ADC 210. The ADC 210 is in turn coupled to the communication processor 124. As depicted along a signal propagation direction for certain example implementations of the transmit chain 252, the communication processor 124 is coupled to the DAC 260, and the DAC 260 is coupled to the mixer circuit 130-1. The mixer circuit 130-1 is coupled to the filter circuit 256, and the filter circuit 256 is coupled to the power amplifier 254. The power amplifier 254 is coupled to the antenna 122 via the signal propagation path 222 using the mixer circuit 130-2 thereof. Although only one receive chain 202 and one transmit chain 252 are explicitly shown, an electronic device 102, or a transceiver 126 thereof, can include multiple instances of either or both components. Although the ADC 210 and the DAC 260 are illustrated as being separately coupled to the communication processor 124, they may share a bus or other means for communicating with the processor 124.

As part of an example signal-receiving operation, the mixer circuit 130-4 (if present) of the signal propagation path 222 down-converts a received signal (e.g., to an intermediate frequency (IF)) and forwards the down-converted signal to the low-noise amplifier 204. The low-noise amplifier 204 accepts the down-converted signal from the RF front-end 128 and provides an amplified signal to the filter circuit 206 based on the accepted signal. The filter circuit 206 filters the amplified signal and provides a filtered signal to the mixer circuit 130-3. The mixer circuit 130-3 performs a frequency down-conversion operation on the filtered signal to down-convert from one frequency to a lower frequency (e.g., from the IF to a baseband frequency (BBF) if the mixer circuit 130-4 is present "upstream" or from a radio frequency (RF) to an IF or BBF in the absence of the mixer circuit 130-4). The mixer circuit 130-3, or multiple mixer circuits, can perform the frequency down-conversion in a single conversion step or through multiple conversion steps using at least one local oscillator 136. The mixer circuit 130-3 can provide a down-converted analog signal to the ADC 210 for analog-to-digital conversion and subsequent forwarding to the communication processor 124 as a digital signal.

As part of an example signal-transmitting operation, the DAC 260 converts a digital signal received from the communication processor 124 to an analog signal. The mixer circuit 130-1 accepts the analog signal at a BBF or an IF directly or indirectly from the DAC 260. The mixer circuit 130-1 upconverts the analog signal to a higher frequency, such as to an IF or an RF, to produce a higher-frequency signal using a signal generated by the local oscillator 136 to have a target synthesized frequency. The mixer circuit 130-1 provides the RF or other upconverted signal to the filter circuit 256. The filter circuit 256 filters the upconverted IF or RF signal and provides a filtered signal to the power amplifier 254. Thus, after the filtering by the filter circuit 256, the power amplifier 254 amplifies the filtered signal and provides an amplified signal to the signal propagation path 222 for signal conditioning. The RF front-end 128 can, for instance if the amplified signal is at IF, use the mixer circuit 130-2 of the signal propagation path 222 to provide an RF signal to the antenna 122 for emanation as a wireless signal 220.

Example implementations of a mixer circuit 130, as described herein, may be deployed at any one or more of the example mixer circuits 130-1, 130-2, 130-3, or 130-4 in the transceiver 126 or the RF front-end 128 or at other mixer circuits of an electronic device 102 (not shown in FIG. 2). The circuitry 200, however, depicts just a few examples for a transceiver 126 and an RF front-end 128. In some cases, the various components that are illustrated in the drawings using separate schematic blocks or circuit elements may be manufactured or packaged in different discrete manners. For example, one physical module may include components of the RF front-end 128 and some components of the transceiver 126, and another physical module may combine the communication processor 124 with the remaining components of the transceiver 126.

Further, in some cases, the antenna 122 may be co-packaged into a module with at least some components of the RF front-end 128 or the transceiver 126. For instance, in a non-limiting example corresponding to a mmW implementation, the transceiver 126 may provide an IF signal to the RF front-end 128. In some of such cases, the RF front-end 128 may be co-packaged into a module with an antenna array version of the antenna 122. Here, the RF front-end 128 includes one or more mixer circuits 130-2 and 130-4 that are configured to upconvert and down-convert between the IF/RF signals. The RF front-end 128 can also provide further signal conditioning, such as phase shifting and the like for beamforming. In another non-limiting example, such as for a 5G New Radio (NR) Frequency Range 1 (FRI) implementation, the RF front-end 128 may not include a mixer (e.g., with a direct-conversion architecture in which frequency translation between BB and RF occurs in the transceiver 126). Even without a mixer, the RF front-end 128 may nonetheless include other components, such as a power amplifier, a low-noise amplifier, a filter, or other conditioning circuitry for processing after or before (for transmission or reception operations, respectively) the signal is processed by the transceiver 126.

In alternative implementations, one or more components may be physically or logically "shifted" to a different part of the wireless interface device 120 as compared to the illustrated circuitry 200 and/or may be incorporated into a different module. For example, a low-noise amplifier 204 or a power amplifier 254 may alternatively or additionally be deployed in the RF front-end 128. Similarly, an ADC 210 or a DAC 260 may alternatively be deployed in the communication processor 124. Further, a receive chain or a transmit chain may be present in the RF front-end 128, and/or the depicted receive chain 202 or transmit chain 252 may be extended into the RF front-end 128 such that the chain(s) are at least partially distributed across the transceiver 126 and the RF front-end 128. A general communication chain with a mixer circuit 130 is described next with reference to FIG. 3.

Figure 3:
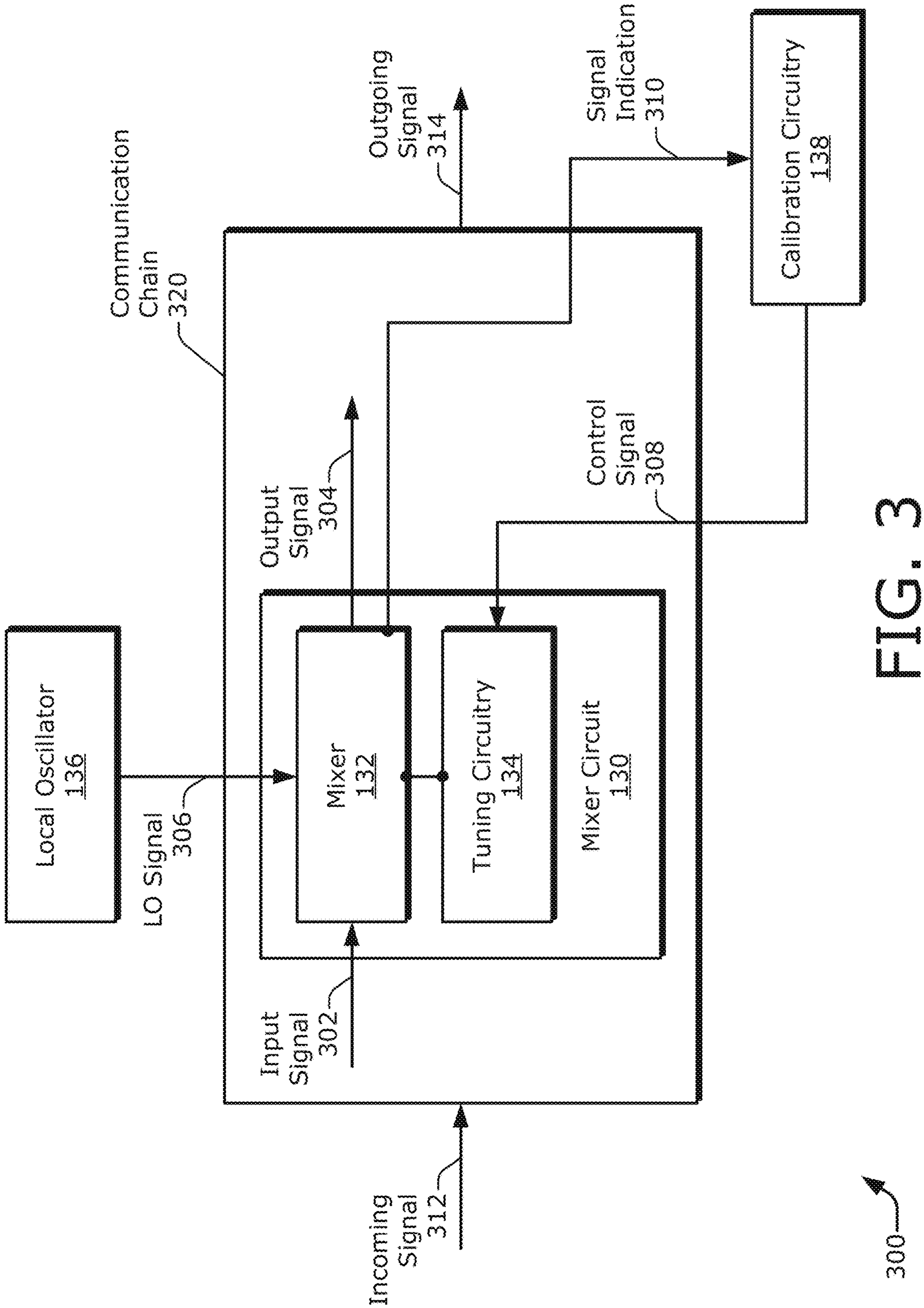
FIG. 3 is a schematic diagram illustrating an example communication chain including a mixer circuit with an associated local oscillator and corresponding calibration circuitry.

FIG. 3 is a schematic diagram 300 illustrating an example communication chain 320 including a mixer circuit 130 with an associated local oscillator 136 and corresponding calibration circuitry 138. As illustrated, the communication chain 320 may accept an incoming signal 312 and produce an outgoing signal 314 using the mixer circuit 130. The communication chain 320 may be realized, for example, as a receive chain 202, a transmit chain 252, or a portion thereof (e.g., each of FIG. 2).

In example implementations, the mixer circuit 130 is electrically or electromagnetically coupled along the communication chain 320. The local oscillator 136 and the calibration circuitry 138 are coupled to the mixer circuit 130. The calibration circuitry 138 may be coupled between the mixer 132 and the tuning circuitry 134 of the mixer circuit 130. Although two components (e.g., the local oscillator 136 and the calibration circuitry 138) are depicted separately from the communication chain 320 in FIG. 3, the local oscillator 136 or the calibration circuitry 138 (including both in some cases) can be included fully or partially as a component of the communication chain 320. Alternatively, but by way of example only, the local oscillator 136 may service mixer circuits of multiple communication chains, and the calibration circuitry 138 may be incorporated at least partially as a portion of a communication processor (e.g., the communication processor 124 of FIGS. 1 and 2).

As shown, the mixer circuit 130 includes the mixer 132 and the tuning circuitry 134. The mixer 132 is coupled to the tuning circuitry 134. In some cases, the calibration circuitry 138 is coupled to the mixer 132 and the tuning circuitry 134. In at least some of such cases, the calibration circuitry 138 can be coupled between the tuning circuitry 134 and the mixer 132 via a mixer node (not explicitly shown in FIG. 3) that is coupled between two or more stages of the mixer 132. Multiple stages of the mixer 132 are described below with reference to FIG. 5. The local oscillator 136 can be coupled to the mixer circuit 130 via the mixer 132.

In example operations, the local oscillator 136 generates a LO signal 306. The mixer 132 accepts or receives an input signal 302 from an upstream component (not shown in FIG. 3) of the communication chain 320. The mixer 132 also accepts or receives the LO signal 306 from the local oscillator 136. Based on the input signal 302 and the LO signal 306, the mixer 132 produces an output signal 304. The mixer 132 provides or forwards the output signal 304 to a downstream component (not shown in FIG. 3) of the communication chain 320. The mixer 132 converts a frequency of the input signal 302 (e.g., an input frequency) to another frequency of the output signal 304 (e.g., an output frequency) based on a LO frequency of the LO signal 306 and the input frequency of the input signal 302. The frequency conversion operation (or "frequency translation") may be an up-conversion operation that increases the frequency (e.g., for a transmit chain) or a down-conversion operation that decreases the frequency (e.g., for a receive chain).

The calibration circuitry 138 obtains an indication of a signal, such as a voltage or current magnitude, that exists with respect to the mixer 132, which is referred to herein as a signal indication 310. Based on the signal indication 310, the calibration circuitry 138 produces a control signal 308. The calibration circuitry 138 provides the control signal 308 to the mixer circuit 130 via the tuning circuitry 134. Responsive to the control signal 308, the tuning circuitry 134 modifies the behavior or operation of the mixer 132 to counteract (e.g., at least reduce, if not minimize) feed-through of the LO signal 306 into the output signal 304, and thus along the communication chain 320.

A timing of a calibration procedure can vary based on implementation. In some cases, the calibration circuitry 138 is run initially to establish a tuning value. The calibration circuitry 138 may be run, for instance, as part of a factory calibration during manufacture of a wireless interface device or assembly of an electronic device. The resulting tuning value can be stored by the wireless interface device for later use. The calibration procedure may be run at different temperatures to obtain and store different tuning values for different operational temperatures. Subsequently, the stored tuning value is retrieved or applied so the turning circuitry 134 can calibrate the mixer circuit 130 and thereby reduce the oscillator leakage or LOFT. The subsequent use may occur, for instance, during mission mode operation (e.g., in the field).

In other cases, the calibration procedure may be performed while the electronic device is in the field. In still other cases, calibration procedures may be performed by a device manufacturer and again later by a device user. Later calibration procedures may be performed once or repeatedly (e.g., at start up, at regular intervals, based on environmental and/or location changes, or responsive to band or other frequency changes). In any of such calibration procedure cases, example implementations of the calibration procedure can be performed in manners that operate a portion of the mixer 132 in a DC mode, which is described below with reference to FIG. 5. Next, however, example implementations are described in which the tuning circuitry 134 includes a bias voltage generator with reference to FIG. 4.

Figure 4:
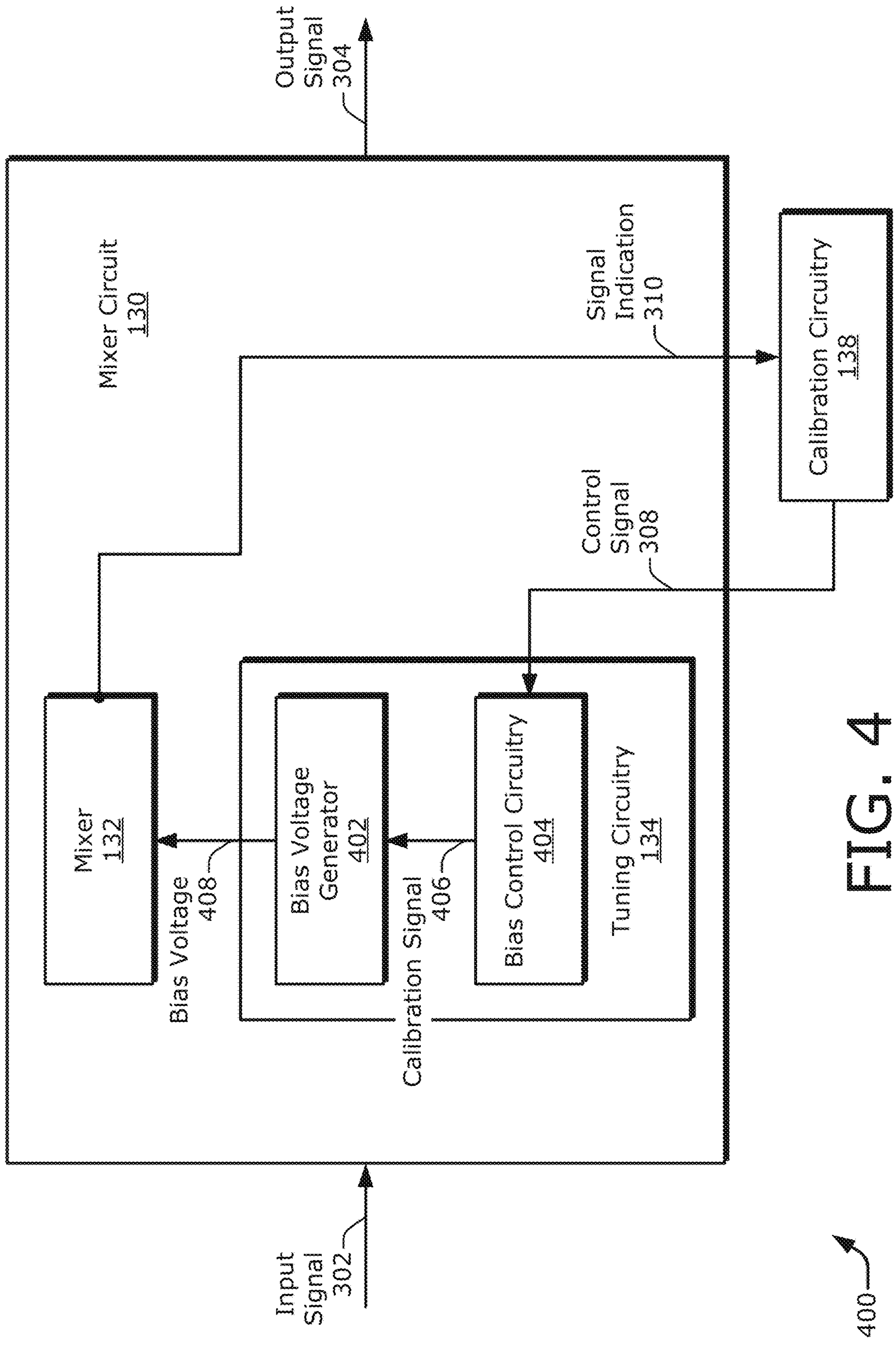
FIG. 4 is a circuit diagram illustrating an example mixer circuit having a mixer and example tuning circuitry, which includes a bias voltage generator and bias control circuitry.

FIG. 4 is a circuit diagram 400 illustrating an example mixer circuit 130 having a mixer 132 and example tuning circuitry 134. The example tuning circuitry 134 includes at least one bias voltage generator 402 and at least one instance of bias control circuitry 404. The circuit diagram 400 also includes calibration circuitry 138. As shown, the bias voltage generator 402 is coupled to the mixer 132, and the bias control circuitry 404 is coupled to the bias voltage generator 402. Further, the bias voltage generator 402 is coupled between the bias control circuitry 404 and the mixer 132.

In example implementations, the calibration circuitry 138 is coupled between the mixer 132 and the bias voltage generator 402 of the tuning circuitry 134. The calibration circuitry 138 may also be coupled between the mixer 132 and the bias control circuitry 404, with the bias control circuitry 404 coupled between the calibration circuitry 138 and the bias voltage generator 402. In example operations, the calibration circuitry 138 obtains at least one signal indication 310 from the mixer 132, such as by sensing or measuring a voltage or current. The signal indication 310 may represent or otherwise indicate a current (e.g., a magnitude thereof that is) flowing through at least one transistor of the mixer 132.

Based on the signal indication 310, the calibration circuitry 138 produces at least one control signal 308. For instance, the calibration circuitry 138 can produce the control signal 308 to reduce a difference between two currents flowing through two or more transistors of the mixer 132. The bias control circuitry 404 accepts the control signal 308 and produces at least one calibration signal 406 based on the control signal 308. The bias control circuitry 404 can be realized using, for instance, a register, multiple switches, one or more fuses, some combination thereof, and so forth. The register, the fuses, and so forth may be capable of maintaining data for the calibration signal 406 in the absence of power. Further, the bias control circuitry 404 may be distributed such that, for instance, one volatile register "directly" provides the calibration signal 406 to the bias voltage generator 402 and another nonvolatile register retains a tuning value for the volatile register when the power is turned off.

The bias control circuitry 404 can provide the at least one calibration signal 406 to the bias voltage generator 402 during calibration and mission modes. Based on the calibration signal 406, the bias voltage generator 402 generates at least one bias voltage 408. With a differential mixer 132, the bias voltage generator 402 can generate a plus bias voltage and a minus bias voltage and provide these voltages to respective gate terminals of plus and minus transistors of the mixer 132. This is described further below with reference to FIGS. 6-9.

The bias voltage generator 402 may be implemented in any of various manners. For example, the bias voltage generator 402 can include one or more current sources (not shown) coupled between first and second power distribution nodes and one or more resistors (not shown) coupled in series with the one or more current sources between the first and second power distribution nodes. The first and second power distribution nodes may be realized using, for example, a supply voltage node and a ground node. In some cases, the one or more current sources, which may be realized using at least one adjustable current source, can be coupled in series with at least one resistor. In other cases, the one or more resistors, which may be realized using at least one adjustable resistor, can be coupled in series with at least one current source. Adjusting a current magnitude or a resistance value can adjust a voltage applied to a gate terminal of a transistor.

In some aspects, the bias voltage generator 402 can be implemented with multiple current sources and multiple switches, with each switch of the multiple switches respectively coupled to a current source of the multiple current sources. To control the bias voltage 408, at least one register of the bias control circuitry 404 can be coupled to the multiple switches. With the at least one register including multiple bits, each bit of the multiple bits can respectively correspond to a switch of the multiple switches. Additionally or alternatively, the bias voltage generator 402 can be implemented with multiple resistors and multiple switches, with each switch of the multiple switches respectively coupled to a resistor of the multiple resistors.

Figure 5:
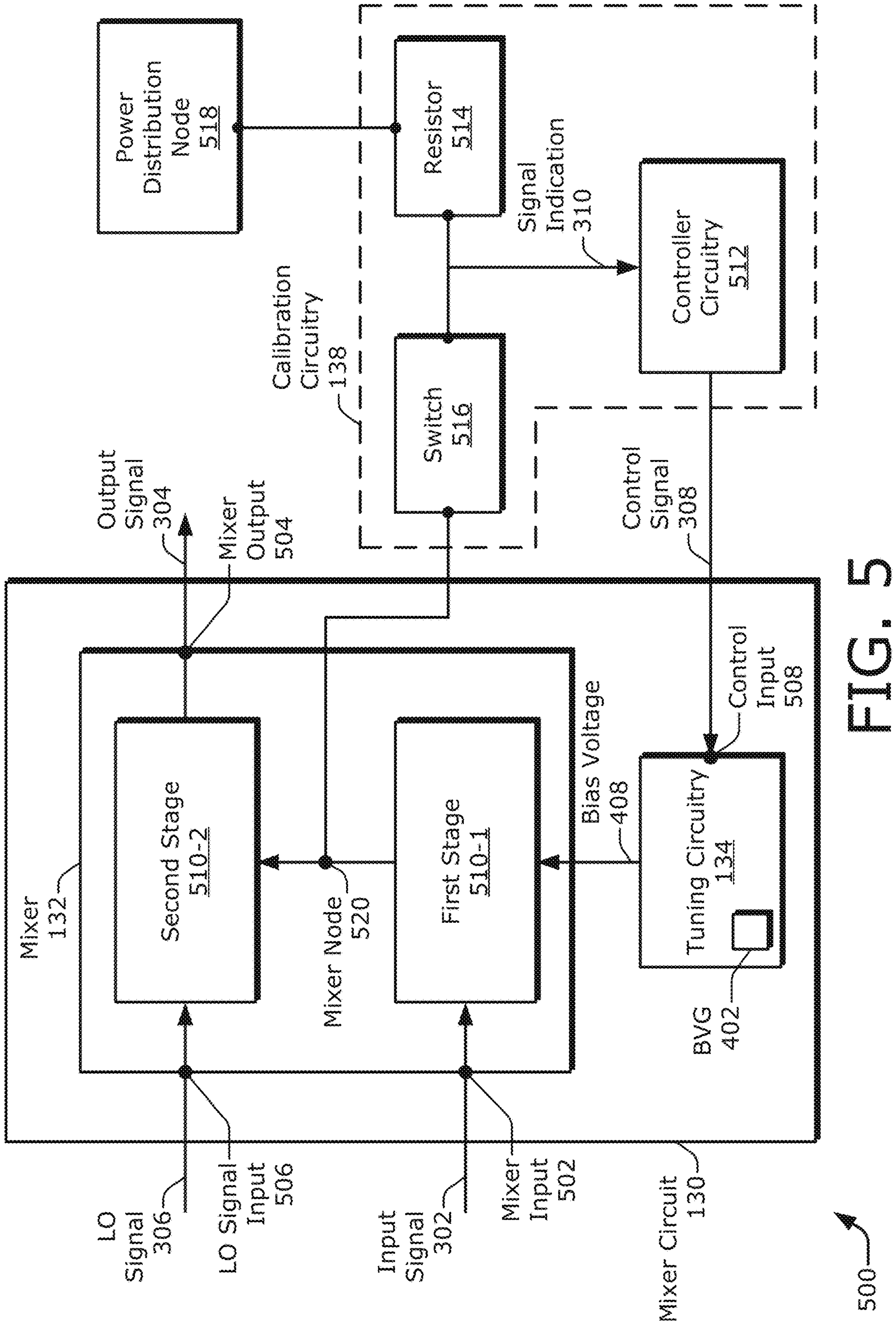
FIG. 5 is a schematic diagram illustrating example calibration circuitry and an example mixer circuit including an example mixer with multiple stages and tuning circuitry that is coupled to a first stage of the multiple stages.

FIG. 5 is a schematic diagram 500 illustrating example calibration circuitry 138 and an example mixer circuit 130. The example mixer circuit 130 includes example tuning circuitry 134 and an example mixer 132 with multiple stages 510-1 and 510-2. As shown, the mixer 132 includes a mixer input 502 to accept or receive the input signal 302, and a mixer output 504 to provide or transmit the output signal 304. The mixer 132 also includes a LO signal input 506 to accept or receive the LO signal 306. The tuning circuitry 134 includes a control input 508 to accept or receive the control signal 308. The input(s) and the output(s) can be realized, for example, with a node, a port, at least a portion of a wire or other conductive element, at least part of a transistor (e.g., a terminal thereof), a combination thereof, and so forth.

In example implementations, the mixer 132 includes multiple stages, such as two stages: a first stage 510-1 and a second stage 510-2. Other implementations of the mixer 132, however, may have a single stage or more than two stages. In some cases, the first stage 510-1 is realized as a transconductance stage (or "Gm stage") with at least one transistor, which is referred to herein as a transconductance transistor (e.g., as shown in FIGS. 6-9). Accordingly, the second stage 510-2 may be realized as a cascode stage with one or more transistors, which may be referred to herein as cascode transistors or switching transistors (including mixer switching transistors) (e.g., as shown in FIGS. 6-9). At least one mixer node 520 is coupled between two stages of the mixer 132, such as between the first stage 510-1 and the second stage 510-2. Examples of multistage implementations of the mixer 132 with multiple transistors are described below with reference to FIGS. 6-9.

In example operations of the mixer circuit 130, the tuning circuitry 134 produces at least one bias voltage 408 based on the control signal 308. The tuning circuitry 134 provides the bias voltage 408 to the mixer 132, such as to the first stage 510-1 thereof. The bias voltage 408 can affect the operation of the mixer 132 to reduce feedthrough of the LO signal 306 to the output signal 304 and to downstream components. In example aspects, the bias voltage 408 can compensate for an imbalance in the plus-minus components of the mixer 132. In some implementations, the tuning circuitry 134 includes at least one bias voltage generator 402 (BVG 402). The calibration circuitry 138 can control the bias voltage generator 402 to generate the bias voltage 408 as described next.

As illustrated, the calibration circuitry 138 includes at least one instance of controller circuitry 512, at least one resistor 514, and at least one switch 516. As described below, any one or more of these components may be coupled to at least one power distribution node 518. A power distribution node 518 may be realized as, for example, a supply voltage node (e.g., a power rail) or a ground node (e.g., a ground plane).

In example implementations, the switch 516 is coupled between the mixer node 520 and the power distribution node 518. The resistor 514 is also coupled between the mixer node 520 and the power distribution node 518. In some cases, the switch 516 and the resistor 514 are coupled in series together between the mixer node 520 and the power distribution node 518. In at least some of such cases, the switch 516 is coupled between the resistor 514 and the mixer node 520, but other arrangements may be employed instead.

The controller circuitry 512 is coupled between the mixer node 520 and the control input 508 of the tuning circuitry 134. In some cases, the switch 516 is coupled between the mixer node 520 and the controller circuitry 512. Alternatively, the switch 516 may be coupled between the mixer node 520 and the power distribution node 518 at a position that is not between the mixer node 520 and the controller circuitry 512.

In example operations, the calibration circuitry 138 closes the switch 516 or places the switch 516 in a closed state. With the switch 516 being closed, a current can flow between the power distribution node 518 and a transconductance transistor (not shown in FIG. 5) of the first stage 510-1. This current flows through the resistor 514 and establishes a voltage at the mixer node 520 based on a voltage drop across the resistor 514. The controller circuitry 512 can sense or measure a level of this voltage as the signal indication 310. Because the voltage at the mixer node 520 changes based on a magnitude of the current flowing through the resistor 514 and the transconductance transistor of the first stage 510-1, this voltage may represent or indicate a magnitude of the current flowing through the transconductance transistor.

From a signal processing or information propagation perspective or from a temporal perspective, the controller circuitry 512 may operate "before" the tuning circuitry 134. Based on the signal indication 310, the controller circuitry 512 produces the control signal 308. The control signal 308 causes the tuning circuitry 134 to establish the bias voltage 408 using the bias voltage generator 402. The bias voltage generator 402 can apply the bias voltage 408 to a gate terminal of at least one transconductance transistor of the first stage 510-1. By adjusting the bias voltage 408, the current flowing through the transconductance transistor is likewise adjusted. The adjusted current changes the current flowing through the resistor 514 and therefore the voltage measured with respect to the mixer node 520.

Thus, the controller circuitry 512 can use the control signal 308, responsive to changes to the signal indication 310, to change the current flowing through the transconductance transistor of the first stage 510-1. As described above and depicted in FIGS. 6-9, the first stage 510-1 can include a plus transconductance transistor and a minus transconductance transistor. In some aspects, the controller circuitry 512 adjusts a plus current flowing through the plus transconductance transistor and a minus current flowing through the minus transconductance transistor to reduce a difference between them. By reducing this current offset between the plus and minus portions of the mixer 132, oscillator leakage into the output signal 304 is also reduced.

In certain figures (e.g., FIG. 5), only a single line is used to depict that these components are coupled together, and these components may be single-ended with single (or "unbalanced") coupling lines. Nonetheless, these components may also be differential, and the coupling lines may likewise be differential (or "balanced"). For a differential implementation, one or more of the depicted or described components may include a plus component and a minus component. By way of examples only, the mixer node 520 may include a plus mixer node and a minus mixer node, the switch 516 may include a plus switch and a minus switch, and the resistor 514 may include a plus resistor and a minus resistor. Further, the signals may include plus and minus signals. For example, the signal indication 310 may include a plus signal indication and a minus signal indication at a same time or at different times, and the bias voltage 408 may include a plus bias voltage and a minus bias voltage to be applied respectively to a gate of a plus transconductance transistor and a gate of a minus transconductance transistor.

The controller circuitry 512 may be realized using, at least partially, one or more digital circuits. These digital circuits may be part of the communication processor 124 or another portion of the wireless interface device 120. Such digital circuits may also be distributed across multiple portions of the wireless interface device 120. The digital circuits may include, for example, an analog-to-digital converter (ADC) and logic circuitry, such as a state machine. The ADC can produce a digital version of the signal indication 310. The logic circuitry can determine at least one value (e.g., a digital version of a calibration signal 406 of FIG. 4) for a register based on the digital voltage level during a calibration mode. The logic circuitry may, for instance, iteratively use different values to reduce, if not minimize, a digital difference between plus and minus voltage levels at plus and minus realizations of the mixer node 520 to a degree permissible given the quantization of the signal indication 310, a noise floor, and so forth.

Additionally or alternatively, the controller circuitry 512 may be realized using, at least partially, one or more analog circuits. For instance, as part of an analog control loop, the controller circuitry 512 can include a comparator that compares the voltage level at the mixer node 520—as represented by the signal indication 310—to a reference voltage level. Based on the signal indication 310, the controller circuitry 512 produces the control signal 308 using analog or digital circuitry (e.g., logic circuitry such as a state machine) during the calibration mode. The controller circuitry 512 provides the control signal 308 to the tuning circuitry 134 of the mixer circuit 130 (e.g., which may be forwarded, with or without further processing, as a digital or an analog version of a calibration signal 406). Use of the control signal 308 by the mixer circuit 130 is described further below with reference to FIGS. 5-9.

Generally, the calibration circuitry 138 can produce the control signal 308 to counteract flowthrough of the LO signal 306 through some portion of the communication chain 320 (of FIG. 3). To enable a DC current to flow through the first stage 510-1 and the resistor 514 without being diverted to the second stage 510-2, one or more switching transistors of the second stage 510-2 are turned off during the calibration mode. By turning off the one or more switching transistors of the second stage 510-2, at least one current flowing through at least one transistor of the first stage 510-1 is routed to also flow through at least one resistor 514.

In some aspects, at least one calibration signal 406 (e.g., of FIG. 4) that is derived from the at least one control signal 308 can be realized as at least one calibration code that is determined by converging to at least one code (e.g., a plus code and a minus code). The at least one converged code can provide a minimum difference between plus and minus voltage levels as reflected by the plus and minus versions of the signal indication 310, which represent plus and minus currents of the first stage 510-1. This converged minimization of the current offset can produce a minimum LOFT, at least with respect to the LOFT that is due to current mismatch in transconductance transistors of the first stage 510-1 of the mixer 132.

Here, the minimum current offset or LOFT is a minimum under one or more constraints, such as the implemented circuit components of the calibration circuitry 138, the capabilities of the tuning circuitry 134, or an available precision of the bits in the digital circuitry portion of the calibration circuitry 138 and/or the calibration value of the control signal 308. The control signal 308, such as one or more bits of at least one tuning value for the calibration signal 406 (e.g., of FIG. 4), can be stored in at least one register (e.g., of the bias control circuitry 404) that persists without power. The tuning value may be stored in association with one or more other parameters that can affect the tuning value, such as temperature. The register can be realized using a flash memory, a programmable read-only memory (PROM), an electrically erasable programmable read-only memory (EEPROM), one or more fuses, and so forth.

Thus, in certain digital implementations for the controller circuitry 512, the controller circuitry 512 can determine a tuning value that is written to or otherwise stored in at least one register (not shown in FIG. 5) during a calibration mode. The register may be part of the controller circuitry 512, part of the mixer circuit 130 (e.g., part of the tuning circuitry 134, such as the bias control circuitry 404 (of FIG. 4)), part of other control circuitry, some combination thereof, and so forth. During a mission mode, software, firmware, or other circuitry can read or otherwise retrieve the tuning value from the register to apply the tuning value to operation of the tuning circuitry 134, such as to produce a calibration signal 406 that sets a bias voltage 408. Alternatively, the register can otherwise be coupled to the tuning circuitry 134 to expose the tuning value thereof to control the operation of the tuning circuitry 134.

A wireless interface device 120 may also have multiple registers. For example, one register may retain the tuning value without power (e.g., via a nonvolatile memory cell), and another register may hold the tuning value during the mission mode after software, firmware, or circuitry loads the tuning value from the one (nonvolatile) register to the other (volatile) register. In other implementations, the calibration mode and the mission mode may be merged, or the device may switch between the two modes sufficiently quickly and/or frequently, that the calibration procedure is performed in a continuing loop or in a partially or fully continuous loop.

In some implementations, a device may enter the calibration mode and/or perform the calibration procedure once (or a few times) during manufacturing and then the determined tuning values may be used throughout the life of the device during instances of the mission mode. Additionally or alternatively, the device may enter the calibration mode and/or perform the calibration procedure multiple times after the device reaches a user. For example, the calibration procedure can be performed during power-on or resets, at regular intervals (e.g., twice a day or once an hour), during periods when the wireless interface device 120 is not otherwise being used, responsive to a changing environment (e.g., temperature or power level), based on changes to the location of the device, combinations thereof, and so forth. The stored tuning values may be updated each time the device enters the calibration mode and runs a calibration procedure. The device can then use the updated tuning values in the mission mode.

FIGS. 6-9 are circuit diagrams 600-900, respectively, illustrating example mixer circuits 130 that each include a respective instance of the tuning circuitry 134 (e.g., also of FIGS. 1, 3, 4, and 5) that is implemented with at least one bias voltage generator 402. The circuit diagrams 600-900 also illustrate example implementations of the calibration circuitry 138 as controller circuitry 512, at least one resistor 514, and at least one switch 516. Example implementations of the first and second stages 510-1 and 510-2 of the mixer 132 (which is explicitly indicated in, e.g., FIGS. 1, 3, 4 and 5) are described next with combined reference to FIGS. 6-9.

The first stage 510-1 includes at least one transistor T, such as a plus transistor T+ and a minus transistor T−. These two transistors are also referred to herein as transconductance transistors. The second stage 510-2 includes one or more transistors M, such as a plus transistor M1+, a minus transistor M1−, another plus transistor M2+, and another minus transistor M2−. These four transistors are also referred to herein as switching transistors or mixer switching transistors.

The transistors of the mixer 132 can be arranged in accordance with, for example, a double-balanced Gilbert cell architecture. The illustrated Gilbert cell architecture includes a supply or load line 602. The supply or load line 602 is coupled to a supply voltage (V.Supp), which may correspond to a power distribution node, and the one or more transistors M of the second stage 510-2. The at least one transistor T of the first stage 510-1 is coupled between the second stage 510-2 and a power distribution node, which corresponds to the ground in this instance. Thus, the ground and the supply voltage (V.Supp) are two examples of a power distribution node in FIGS. 6-9.

Each transistor T or M may be realized with any one or more of multiple transistor types. Examples transistor types include a field effect transistor (FET), a junction FET (JFET), a metal-oxide-semiconductor FET (MOSFET), a bipolar junction transistor (BJT), an insulated-gate bipolar transistor (IGBT), and so forth. Manufacturers may fabricate FETs as n-channel or p-channel transistor types and may fabricate BJTs as NPN or PNP transistor types.

Each transistor may include at least one control terminal and one or more channel terminals. With an FET transistor, a control terminal can correspond to a gate terminal, and a channel terminal can correspond to a source terminal or a drain terminal. With a BJT transistor, a control terminal can correspond to a base terminal, and a channel terminal can correspond to an emitter terminal or a collector terminal. In some cases, a source terminal of an FET is analogous to an emitter terminal of a BJT, and a drain terminal of an FET is analogous to a collector terminal of a BJT. Thus, in FIGS. 6-9, the plus transistor T+ can include a plus gate terminal and a plus channel terminal (including two plus channel terminals). Further, the minus transistor T− can include a minus gate terminal and a minus channel terminal (including two minus channel terminals).

With FETs, a gate terminal can be realized as a front-gate terminal or a back-gate terminal. In some cases, an FET may have a front-gate terminal and a back-gate terminal, which is also referred to as a bulk terminal. Accordingly, the plus transistor T+ can include a plus back-gate terminal and a plus front-gate terminal. Similarly, the minus transistor T− can include a minus back-gate terminal and a minus front-gate terminal.

The components of FIGS. 6-9 are depicted with a particular type of transistor (FET) by way of example only, for the described principles can be implemented with other types of transistors. Further, the components are arranged in particular manners across FIGS. 6-9, such a with a double-balanced architecture having a Gilbert-cell configuration. Nonetheless, other circuit arrangements may be employed for alternative implementations of oscillator leakage calibration.

In example implementations, the transistors of the mixer 132 (e.g., of FIG. 5) can be coupled together as shown in FIGS. 6-9. For example, the at least one transistor T of the first stage 510-1 is coupled between the mixer input 502 (e.g., a plus mixer input 502+ or a minus mixer input 502−) and the mixer output 504 (e.g., a plus mixer output 504+ or a minus mixer output 504−). The one or more transistors M of the second stage 510-2 are coupled between the at least one transistor T of the first stage 510-1 and the mixer output 504. The one or more transistors M are also coupled between a local oscillator signal input 506 (e.g., a plus LO signal input 506+ or a minus LO signal input 506−) and the mixer output 504. The bias voltage generator 402 of the tuning circuitry 134 (e.g., of FIGS. 4 and 5) generates at least one bias voltage 408 (e.g., a plus bias voltage 408+ or a minus bias voltage 408−). The at least one voltage 408 (e.g., a plus bias voltage 408+ or a minus bias voltage 408−) is coupled to a gate terminal of the at least one transistor T of the first stage 510-1 (e.g., a plus transistor T+ or a minus transistor T−, respectively).

As shown for a differential signaling implementation, each signal may be realized with a differential signal. Thus, the input signal 302 can be realized as a plus input signal 302+ and a minus input signal 302−. The output signal 304 can be realized as a plus output signal 304+ and a minus output signal 304−. Further, the LO signal 306 can be realized as a plus LO signal 306+ and a minus LO signal 306−. The input signal 302 is coupled to the mixer 132 via at least one gate terminal (e.g., a front-gate terminal) of the at least one transistor T of the first stage 510-1. The local oscillator 136 (e.g., of FIGS. 1-3) is coupled to the mixer 132 via the respective gate terminal(s) of the one or more transistors M of the second stage 510-2.

To perform a calibration procedure, the one or more transistors M1+, M1−, M2+, and M2− of the second stage 510-2 of the mixer circuit 130 can be turned off to focus the analysis on the DC current(s) flowing through the transconductance transistor(s) of the first stage 510-1 of the mixer circuit 130. This off state is indicated in FIGS. 6-9 by depicting the mixer switching transistors with short-dashed lines for a calibration mode. By switching off the one or more transistors M1+, M1−, M2+, and M2− of the second stage 510-2, the current(s) flowing through the plus and minus transistors T+ and T− of the first stage 510-1 is directed to also flow through the resistor 514− or the plus and minus resistors 514+ and 514−, respectively.

Figure 6:
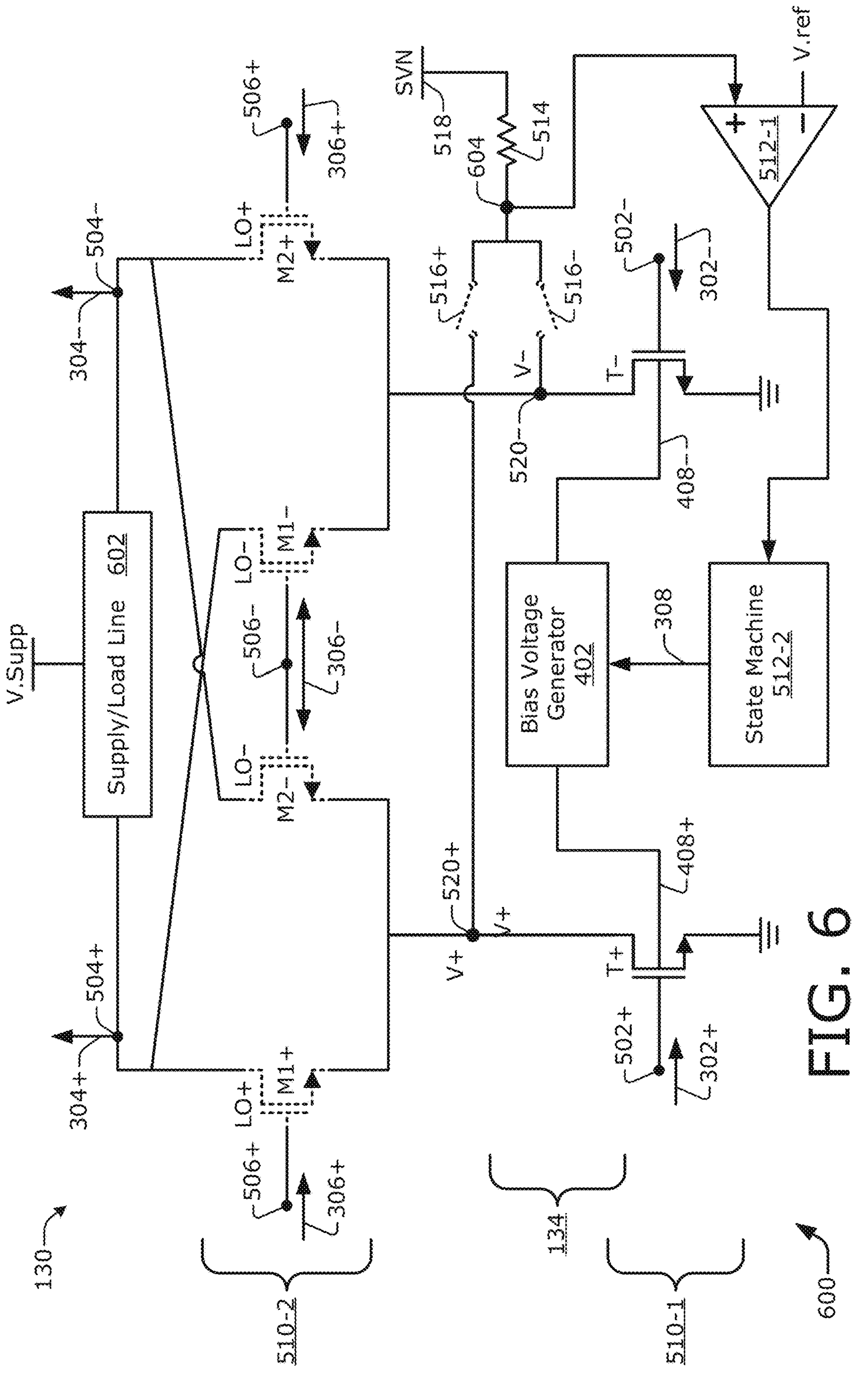
FIG. 6 is a circuit diagram illustrating an example mixer circuit and example calibration circuitry that employs a comparator to adjust a back-gate bias voltage of a transconductance transistor of the mixer circuit.
Figure 7:
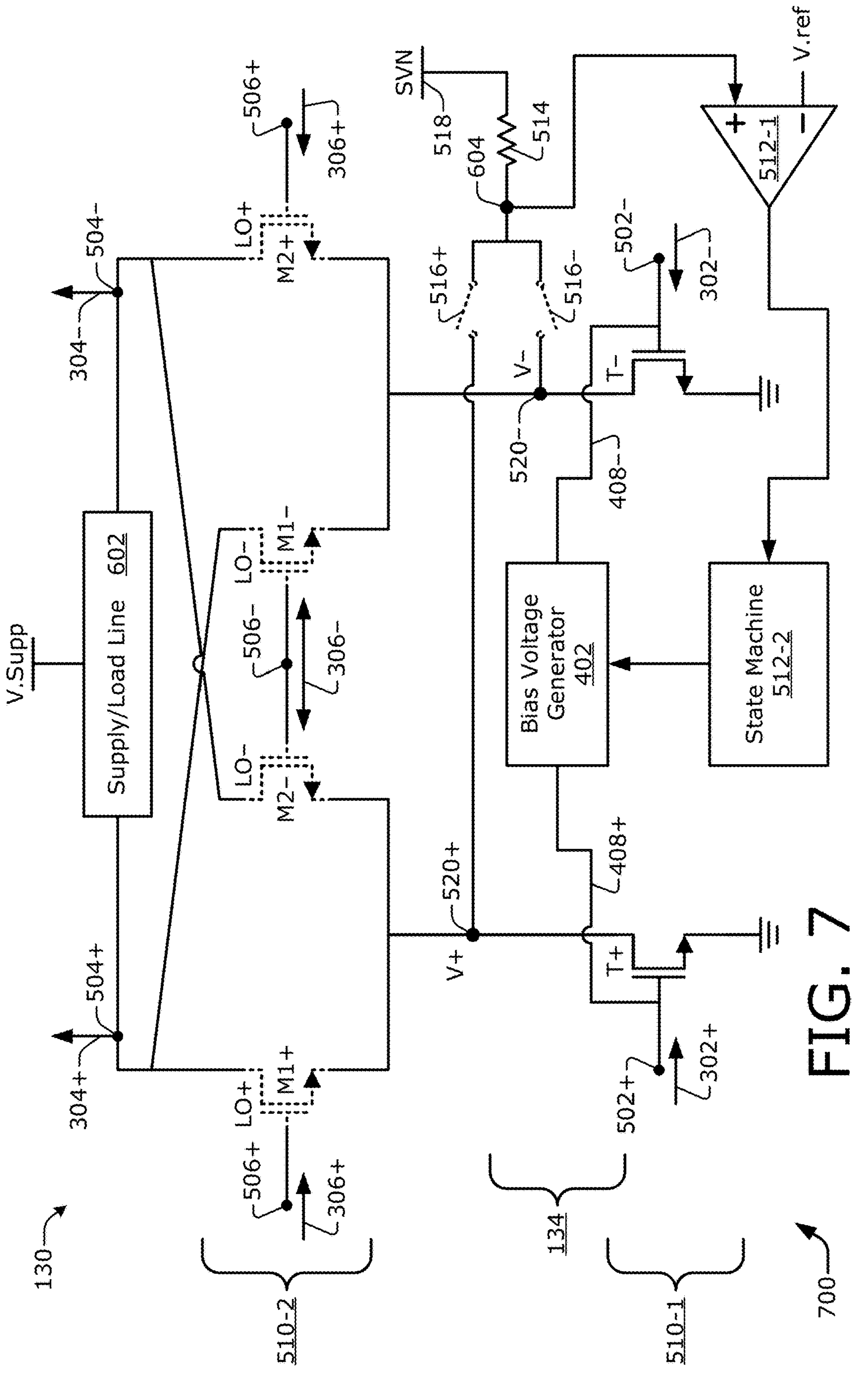
FIG. 7 is a circuit diagram illustrating an example mixer circuit and example calibration circuitry that employs a comparator to adjust a front-gate bias voltage of a transconductance transistor of the mixer circuit.
Figure 8:
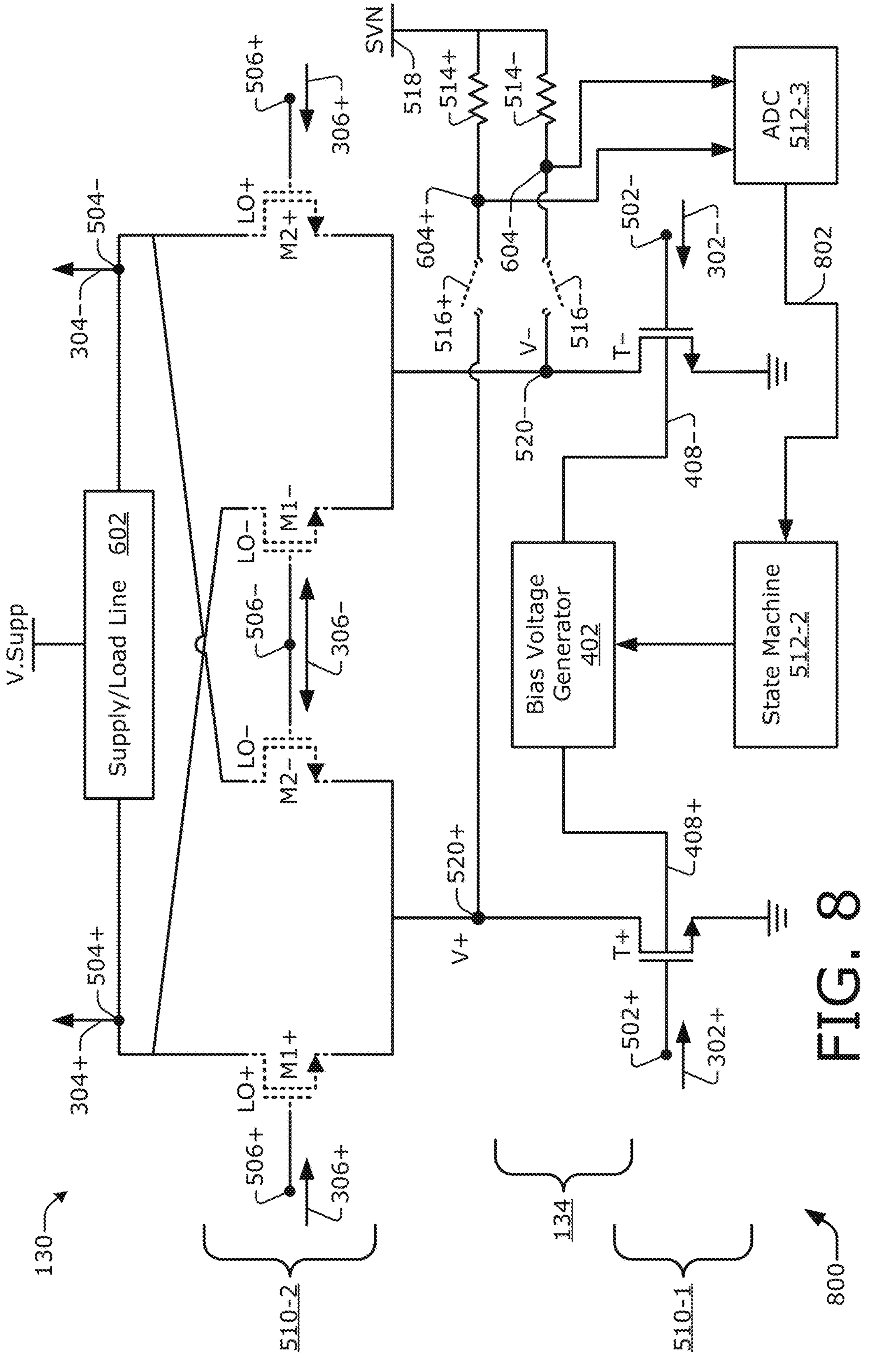
FIG. 8 is a circuit diagram illustrating an example mixer circuit and example calibration circuitry that employs an analog-to-digital converter to adjust a back-gate bias voltage of a transconductance transistor of the mixer circuit.
Figure 9:
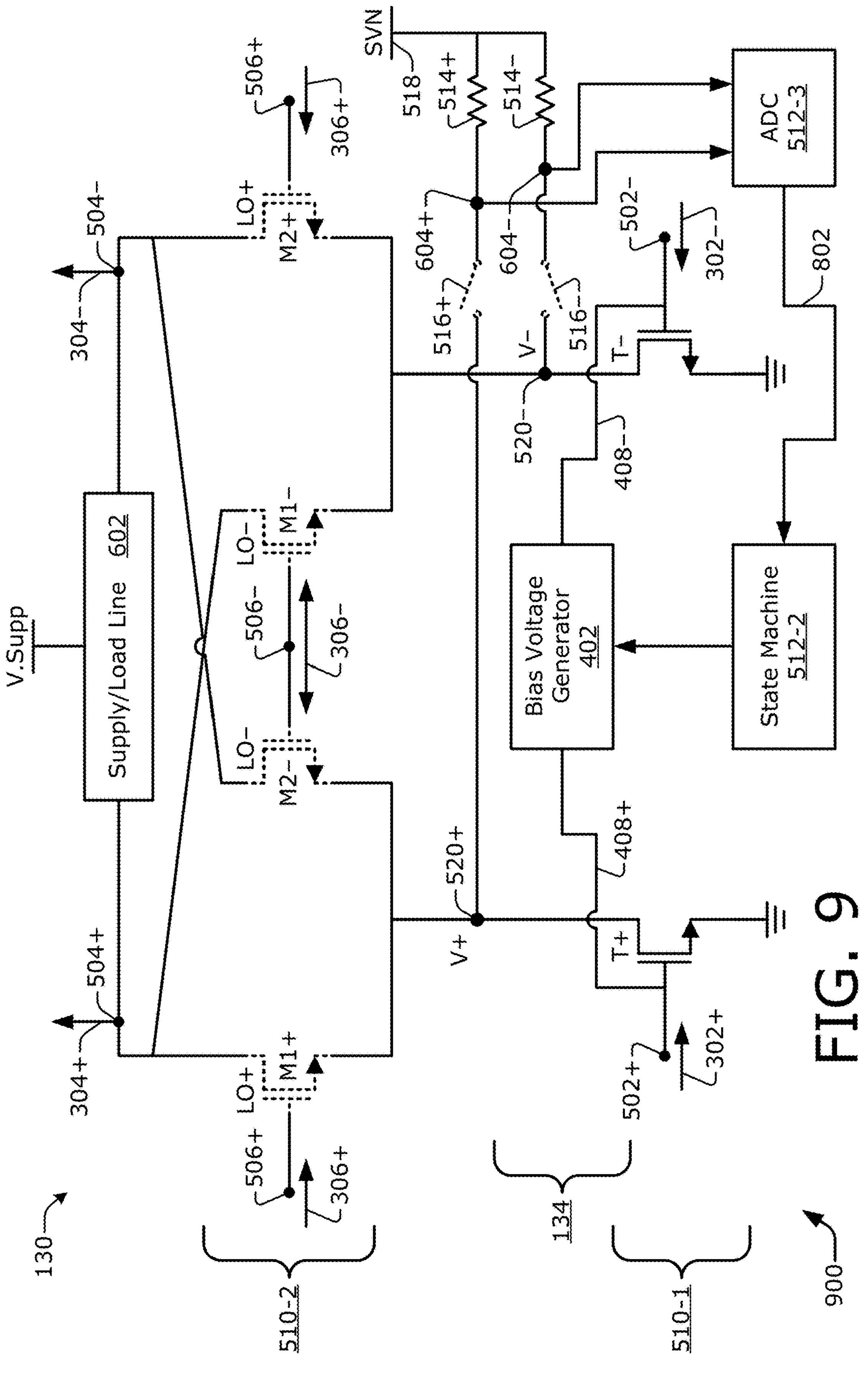
FIG. 9 is a circuit diagram illustrating an example mixer circuit and example calibration circuitry that employs an analog-to-digital converter to adjust a front-gate bias voltage of a transconductance transistor of the mixer circuit.

FIGS. 6, 7, 8, and 9) are now addressed individually to describe aspects of the various implementations depicted in the circuit diagrams 600, 700, 800, and 900, respectively. FIGS. 6 and 7 both employ a comparator 512-1 as part of the controller circuitry 512. However, the circuit diagram 600 couples an adjustable bias voltage 408 to back-gate terminals (e.g., bulk terminals) of the transistors of the first stage 502-1, but the circuit diagram 700 couples the adjustable bias voltage 408 to front-gate terminals of these transistors. FIGS. 8 and 9 both employ an ADC 512-3 as part of the controller circuitry 512. However, the circuit diagram 800 couples an adjustable bias voltage 408 to back-gate terminals (e.g., bulk terminals) of the transistors of the first stage 502-1, but the circuit diagram 900 couples the adjustable bias voltage 408 to front-gate terminals of these transistors.

FIG. 6 is a circuit diagram 600 illustrating an example mixer circuit 130 and example calibration circuitry that employs at least one comparator 512-1 to adjust a back-gate bias voltage 408 of a transconductance transistor T of the mixer circuit 130. In example implementations, the at least one resistor 514 is switchably coupled to the plus mixer node 520+ and the minus mixer node 520−. A plus switch 516+ is coupled between the resistor 514 and the plus mixer node 520+. A minus switch 516− is coupled between the resistor 514 and the minus mixer node 520−.

The resistor 514 is coupled between a power distribution node 518 (e.g., a supply voltage node (SVN)) and the at least one mixer node 520. The at least one switch 516 may likewise be coupled between the power distribution node 518 and the at least one mixer node 520. As shown, the at least one switch 516 and the at least one resistor 514 may be coupled in series together between the power distribution node 518 and the at least one mixer node 520. More specifically, the plus switch 516+ and the resistor 514 may be coupled in series between the plus mixer node 520+ and the power distribution node 518. Similarly, the minus switch 516− and the resistor 514 may be coupled in series between the minus mixer node 520− and the power distribution node 518.

The comparator 512-1 includes a first input, a second input, and an output. The first input is coupled to a node 604 that is coupled between the at least one switch 516 (e.g., the plus and minus switches 516+ and 516−) on one side and the resistor 514 on the other side. The second input is coupled to a reference voltage (V.ref). The reference voltage may be selected to attain or realize a targeted or specified current to be flowing through the at least one transistor T of the first stage 510-1. The output of the comparator 512-1 is coupled to an input of a state machine 512-2 or logic circuitry generally. The state machine 512-2 can control operation of a calibration procedure, which is described below.

An output of the state machine 512-2 is provided to the bias voltage generator 402. Although not shown in FIGS. 6-9 for clarity, bias control circuitry 404 (e.g., of FIG. 4) can be coupled between the state machine 512-2 and the bias voltage generator 402 to control the bias voltage generator 402 (e.g., by storing or otherwise maintaining a tuning value that sets a bias voltage 408). The bias voltage generator 402 generates the at least one bias voltage 408, such as a plus bias voltage 408+ and a minus bias voltage 408−. The bias voltage generator 402 can provide the bias voltage 408 to a back-gate terminal, or bulk terminal, of the at least one transistor T. Thus, a plus bias voltage 408+ can be coupled to the back-gate terminal of the plus transistor T+, and a minus bias voltage 408− can be coupled to the back-gate terminal of the minus transistor T−.

By way of example only, back-gate terminals can be designed into transistors built with Fully Depleted Silicon-On-Insulator (FDSOI) technology. The back-gate (or bulk) terminal can be used, for instance, to change a threshold voltage of the transistor. Thus, changing a level of a bias voltage 408 that is applied to a back-gate terminal of a transistor T changes a threshold voltage of the transistor T. For example, increasing a level of the bias voltage 408 applied to the back-gate terminal of the transistor T can decrease the threshold voltage of the transistor T.

In example operations, the state machine 512-2 can control operation of a calibration procedure by the calibration circuitry 138 (e.g., of FIGS. 1, 3, 4, and 5). The state machine 512-2 can, for instance, control switch states. With the plus switch 516+ in a closed state and the minus switch 516− in an open state, current can flow between the power distribution node 518 and the ground through the resistor 514 and the plus transistor T+. This current produces a voltage at the node 604 due to the voltage drop from the supply voltage node (SVN) as caused by current flowing through the resistor 514. The first input (e.g., the "+" input) of the comparator 512-2 senses or measures a plus voltage V+ at the node 604.

The comparator 512-1 compares the measured voltage from the node 604 to the reference voltage (V.ref) at the second input (e.g., the "−" input). Responsive to there being a difference between these two voltages, the comparator 512-1 produces an output signal that indicates the voltage difference. The state machine 512-2 produces the control signal 308 to reduce this voltage difference. The voltage difference may be reduced until, for instance, the output of the comparator 512-1 toggles. Thus, the control signal 308 may cause the bias voltage generator 402 to decrease or increase the plus bias voltage 408+ to reduce the difference between the voltage at the node 604, which corresponds to the voltage at the plus mixer node 520+, and the reference voltage (V.ref).

The state machine 512-2 repeats this process for the minus portion of the mixer. With the minus switch 516− in a closed state and the plus switch 516+ in an open state, current can flow between the power distribution node 518 and the ground through the resistor 514 and the minus transistor T−. The first input (e.g., the "+" input) of the comparator 512-2 senses or measures a minus voltage V− at the node 604. Here, for FIGS. 6 and 7, node 604 may form a common node for analyzing the plus and minus portions of the mixer circuit 130. The state machine 512-2 causes the bias voltage generator 402 to adjust the minus bias voltage 408− to reduce a difference between the voltage at the node 604, which corresponds to the voltage at the minus mixer node 520−, and the reference voltage (V.ref). The voltage difference may be reduced to within a tolerance enabled by the hardware components, whether the control components be analog, digital, or a combination thereof.

In these manners, the currents flowing through the plus and minus transistors T+ and T− may be calibrated to be substantially equal to thereby reduce a current offset between the plus and minus branches of the mixer. Because the current offset and oscillator leakage are correlated, this current offset reduction can also reduce the oscillator leakage. By using a same at least one resistor for the plus and minus portions of the calibration procedure, the circuit diagram 600 can omit "double sampling," which might otherwise be used to account for resistor mismatch. By omitting the double sampling, a single switch 516 (e.g., instead of a pair of switches) can be coupled to each of the plus and minus mixer nodes 520+ and 520− in the circuit to support the calibration procedure. The single switch per plus/minus node or differential branch therefore imposes less parasitic capacitance at the source terminals of the switch transistors M of the second stage 510-2 as compared to two switches per plus/minus node or differential branch. Parasitic effects at these terminals can appreciably impact mixers, especially those with high-frequency LO signals because the swing at these nodes is twice the LO frequency.

FIG. 7 is a circuit diagram 700 illustrating an example mixer circuit 130 and example calibration circuitry that employs a comparator 512-1 to adjust a front-gate bias voltage of a transconductance transistor T of the mixer circuit 130. The circuit diagram 700 is similar to the circuit diagram 600, except for how the bias voltage generator 402 is coupled to the transconductance transistors of the first stage 510-1. Although not shown in the drawings, with the circuit diagram 700 (and the circuit diagram 900 of FIG. 9), the plus and minus input signals 302+ and 302− can be coupled to the front-gates of the plus and minus transconductance transistors T+ and T− using at least one capacitor (e.g., an alternating-current (AC) coupling capacitor).

In some cases, based on process technologies or circuit layouts, for example, it might be more feasible to adjust a bias voltage on a front-gate terminal of the plus and minus transconductance transistors T+ and T− instead of on the back-gate terminals thereof. The calibration scheme depicted in FIG. 6 can be adapted or implemented for front-gate transistor biasing. As shown in FIG. 7, the output of the at least one bias voltage generator 402 can be coupled to the front-gate terminal of the at least one transistor T of the first stage 510-1. Thus, the bias voltage generator 402 can apply a plus bias voltage 408+ to a front-gate terminal of the plus transistor T+. The bias voltage generator 402 can also or instead apply a minus bias voltage 408− to a front-gate terminal of the minus transistor T−.

The calibration procedure can be implemented analogously to the description for FIG. 6. However, a bias voltage generator 402 that is coupled to front-grate terminals of the transconductance transistors involves employing a higher resolution as compared to a bias voltage generator 402 that is coupled to back-gate terminals of the transconductance transistors. This resolution difference may be an order of magnitude difference. For example, for a given amperage resolution for a current flowing through a transconductance transistor, a bias generator voltage step for front-gate control may be approximately 100 microvolts (uV), but a bias generator voltage step for back-gate control may be approximately 1 millivolt (mV).

With at least some process technologies and circuitries, the current offset of a mixer can vary linearly with temperature for a significant portion of an operational temperature range (e.g., from below 0 degrees Celsius (° C.) to nearly 100° C.). In at least some of such cases, a bias voltage generator with a temperature slope feature can be used to compensate for the current offset variation across a given temperature range. For instance, a linear factor that is scaled with changes in temperature can be applied to a tuning value of bias control circuitry 404 of tuning circuitry 134. This can reduce the frequency at which the calibration procedure is repeated. A temperature-compensating bias voltage generator 402 can be deployed in any of the implementations described herein or depicted in the figures, including those of FIGS. 6-9.

FIG. 8 is a circuit diagram 800 illustrating an example mixer circuit 130 and example calibration circuitry that employs an analog-to-digital converter 512-3 (ADC 512-3) to adjust a back-gate bias voltage, or bulk bias voltage, of a transconductance transistor T of the mixer circuit 130. The circuit diagram 800 is similar to the circuit diagram 600, except for how the at least one resistor 514 is coupled to the at least one mixer node 520 and how the controller circuitry 512 is implemented.

In example implementations, the at least one resistor 514 is realized with a plus resistor 514+ and a minus resistor 514−. The plus resistor 514+ is switchably coupled to the plus mixer node 520+, and the minus resistor 514− is switchably coupled to the minus mixer node 520−. A plus switch 516+ is coupled between the plus resistor 514+ and the plus mixer node 520+. A minus switch 516− is coupled between the minus resistor 514− and the minus mixer node 520−.

The plus and minus resistors 514+ and 514− are coupled between the power distribution node 518 (e.g., a supply voltage node (SVN)) and the plus and minus mixer nodes 520+ and 520−, respectively. The plus and minus switches 516+ and 516− may likewise be coupled between the power distribution node 518 and the plus and minus mixer node 520+ and 520−, respectively. As shown, the at least one mixer node 516 and the at least one resistor 514 may be coupled in series together between the power distribution node 518 and the at least one mixer node 520. More specifically, the plus switch 516+ and the plus resistor 514+ may be coupled together in series between the plus mixer node 520+ and the power distribution node 518. Similarly, the minus switch 516− and the minus resistor 514− may be coupled in series between the minus mixer node 520− and the power distribution node 518.

This results in a plus node 604+ that is coupled between the plus switch 516+ on one side and the plus resistor 514+ on the other side and a minus node 604− that is coupled between the minus switch 516− on one side and the minus resistor 514− on the other side. A plus voltage at the plus node 604+ and a minus voltage at the minus node 604− can be coupled to the controller circuitry 512. Specifically, an ADC 512-3 can have two inputs: a plus input (or first input) that is coupled to the plus node 604+ and a minus input (or second input) that is coupled to the minus node 604−. Alternatively, the ADC 512-3 may have a single input that is switchably coupled to the plus and minus nodes 604+ and 604−. At least one output of the ADC 512-3 is coupled to at least one input of the state machine 512-2.

In example operations, under the control of the state machine 512-2, the ADC 512-3 obtains a sample of the plus voltage and the minus voltage at the plus node 604+ and the minus node 604−, respectively. The plus voltage sample can be obtained with the plus switch 516+ being closed and the minus switch 516− being open, and the minus voltage sample can be obtained with the plus switch 516+ being open and the minus switch 516− being closed. The ADC 512-3 provides at least one ADC output signal 802 to the state machine 512-2. In some cases, the ADC output signal 802 corresponds to a digital value (e.g., code) based on the plus voltage and the minus voltage (in analog form), such as a difference between the plus and minus analog voltages being realized as a digital value. Alternatively, the ADC 512-3 can convert the plus and minus analog voltage samples to plus and minus digital values (e.g., codes) and forward the two digital values to the state machine 512-2 as at least one ADC output signal 802. The state machine 512-2 causes the bias voltage generator 402 to adjust the plus and minus bias voltages 408+ and 408− to decrease a difference between the two digital values. The difference can be reduced, for instance, to the limit of the resolution provided by the components, such as a bit-width of the ADC 512-3 or a step size of the bias voltage generator 402. In the circuit diagram 800, these plus and minus bias voltages 408+ and 408− are coupled to back-gate terminals of the plus and minus transistors T+ and T−.

In comparison to the circuit diagrams 600 and 700, the circuit diagram 800 can omit the comparator 512-1. Further, the ADC 512-3 need not be an ADC that is dedicated to current-offset calibrations. Instead, the ADC 512-3 may be an ADC that is "borrowed" from other circuitry, such as the ADC 210 (of FIG. 2) that is used for receiving signals in mission mode. Generally, many SoCs include at least one ADC that can be utilized as the ADC 512-3 for calibration procedures. Although the ADC approach can obviate use of a comparator, by employing plus and minus resistors 514+ and 514−, calibration accuracy may be adversely affected by a mismatch between two different resistance values with the ADC approach.

Double sampling can be used to cancel the resistor mismatch. Double sampling entails coupling each resistor to the plus mixer node 520+ and the minus mixer node 520− to obtain four sampled voltages. This double sampling, however, involves adding two switches beyond the plus and minus 516+ and 516− switches that are depicted in FIG. 8. Doubling this switch count from two to four can increase the deleterious parasitic effects at the source terminals of the mixer switch transistors. As described above, managing the parasitic effects at these nodes can avoid adversely impacting mixer performance, especially for mixers with high-frequency LO signals, because these nodes experience a voltage swing having a frequency that is twice that of the LO frequency. Additionally, parasitic components at the plus and minus mixer nodes 520+ and 520− can limit the bandwidth of IF signaling.

FIG. 9 is a circuit diagram 900 illustrating an example mixer circuit 130 and example calibration circuitry that employs an analog-to-digital converter 512-3 to adjust a front-gate bias voltage of a transconductance transistor T of the mixer circuit 130. The circuit diagram 900 is similar to the circuit diagram 800, except for how the bias voltage generator 402 is coupled to the transconductance transistors T+ and T− of the first stage 510-1.

The calibration scheme depicted in FIG. 8 can be adapted or implemented for front-gate transistor biasing. As shown in FIG. 9, the output of the at least one bias voltage generator 402 can be coupled to the front-gate terminal of the at least one transistor T of the first stage 510-1. Thus, the bias voltage generator 402 can apply a plus bias voltage 408+ to a front-gate terminal of the plus transistor T+. And the bias voltage generator 402 can apply a minus bias voltage 408− to a front-gate terminal of the minus transistor T−. The calibration procedure can be performed by the state machine 512-2 as described above with respect to the circuit diagram 800. The characteristics for front-gate biasing that are described above with reference to FIG. 7, however, also apply.

Figure 10:
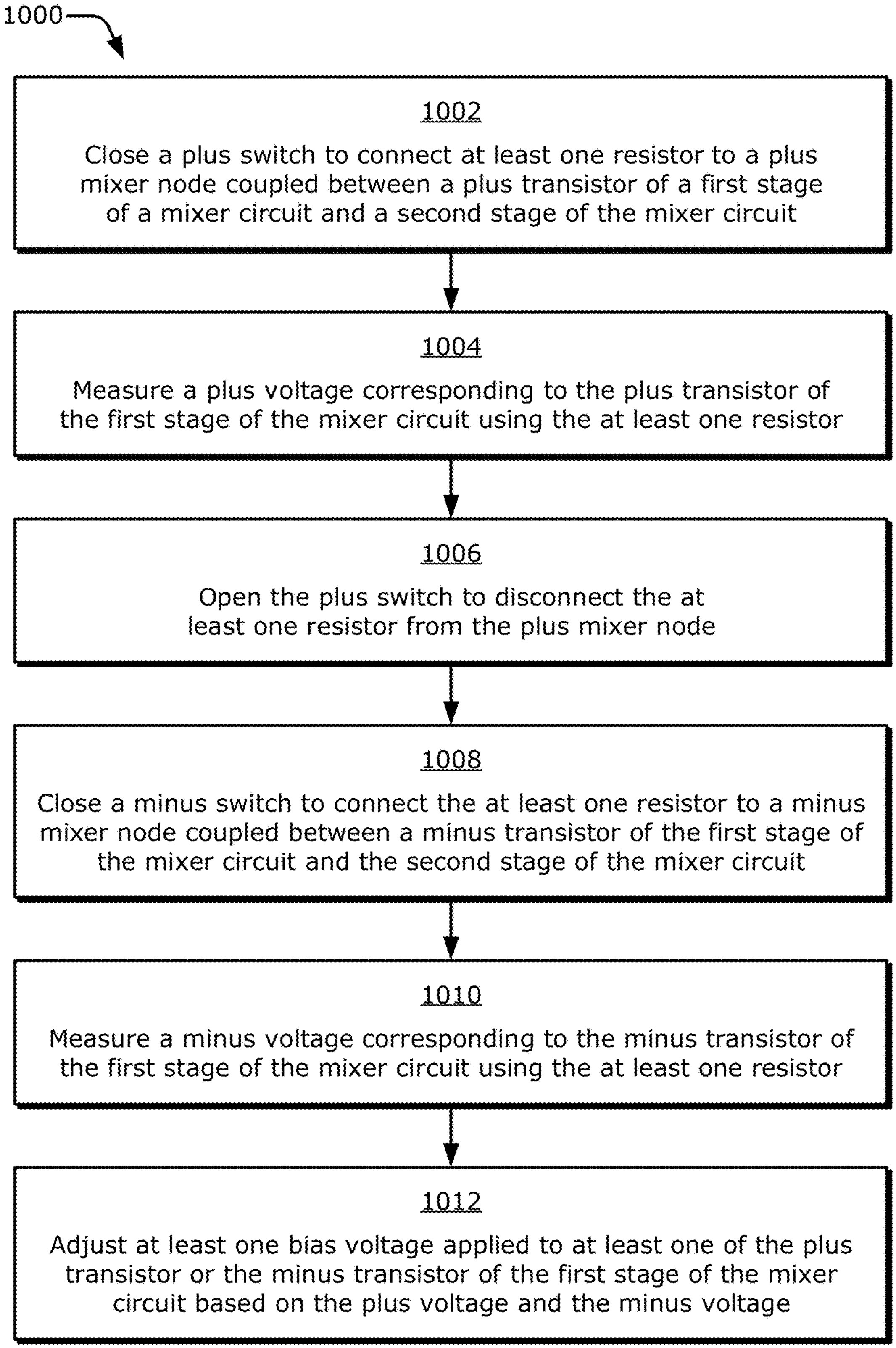
FIG. 10 is a flow diagram illustrating an example process for performing a calibration procedure to counteract oscillator leakage in relation to a mixer circuit or for operating calibration circuitry with respect to a mixer.

FIG. 10 is a flow diagram illustrating an example process 1000 for performing a calibration procedure to counteract oscillator leakage in relation to a mixer circuit or for operating calibration circuitry with respect to a mixer. The process 1000 includes six blocks 1002-1012 that specify operations that can be performed for a method. In example implementations, the operations of the blocks 1002-1012 may be performed during a calibration mode.

To perform a calibration procedure in calibration mode, the one or more transistors M1+, M1−, M2+, and M2− of the second stage 510-2 of the mixer circuit 130 can be turned off to focus the analysis on the DC current(s) flowing through the transconductance transistor(s) of the first stage 510-1 of the mixer circuit 130. This off state is indicated in FIGS. 6-9 by depicting the mixer switching transistors with short-dashed lines. By switching off or tuning off the one or more transistors M1+, M1−, M2+, and M2− of the second stage 510-2, at least one current flowing through the plus and minus transistors T+ and T− of the first stage 510-1 is directed to also flow through the resistor 514− or the plus and minus resistors 514+ and 514−, respectively. The accuracy of the DC measurements can also be improved by turning off the local oscillator or by disconnecting the local oscillator signal 306 from the gate terminals of the one or more transistors M1+, M1−, M2+, and M2− of the second stage 510-2.

At block 1002, calibration circuitry closes a plus switch to connect at least one resistor to a plus mixer node coupled between a plus transistor of a first stage of a mixer circuit and a second stage of the mixer circuit. For example, controller circuitry 512 can close a plus switch 516+ to connect at least one resistor 514 to a plus mixer node 520+ coupled between a plus transistor T+ of a first stage 510-1 of a mixer circuit 130 and a second stage 510-2 of the mixer circuit 130. This connection may enable a plus DC current to flow through the at least one resistor 514 and the plus transistor T+ between two power distribution nodes.

At block 1004, calibration circuitry measures a plus voltage corresponding to the plus transistor of the first stage of the mixer circuit using the at least one resistor. For example, the controller circuitry 512 can measure a plus voltage V+ corresponding to the plus transistor T+ of the first stage 510-1 of the mixer circuit 130 using the at least one resistor 514. In some cases, the plus voltage V+ may be associated with a voltage drop across the at least one resistor 514 due to the flow of the plus DC current through the at least one resistor 514 in addition to the plus transistor T+.

At block 1006, calibration circuitry opens the plus switch to disconnect the at least one resistor from the plus mixer node. For example, the controller circuitry 512 can open the plus switch 516+ to disconnect the at least one resistor 514 from the plus mixer node 520+. Thus, a resistor 514 that may be used for measuring plus and minus voltages may be disconnected from the plus mixer node 520+, or a plus resistor 514+ that is used for measuring plus voltages may be disconnected from the plus mixer node 520+.

At block 1008, calibration circuitry closes a minus switch to connect the at least one resistor to a minus mixer node coupled between a minus transistor of the first stage of the mixer circuit and the second stage of the mixer circuit. For example, the controller circuitry 512 can close a minus switch 516− to connect the at least one resistor 514 to a minus mixer node 520− coupled between a minus transistor T− of the first stage 510-1 of the mixer circuit 130 and the second stage 510-2 of the mixer circuit 130. Here, the connection may entail a resistor 514 that may be used for measuring plus and minus voltages at different times or a minus resistor 514−.

At block 1010, calibration circuitry measures a minus voltage corresponding to the minus transistor of the first stage of the mixer circuit using the at least one resistor. For example, the controller circuitry 512 can measure a minus voltage V-corresponding to the minus transistor T− of the first stage 510-1 of the mixer circuit 130 using the at least one resistor 514. Thus, a comparator 512-1 or an ADC 512-3 may obtain an indication of a plus DC current corresponding to the plus transistor T+ and a minus DC current corresponding to the minus transistor T− across the operations of blocks 1004 and 1010.

At block 1012, calibration circuitry adjusts at least one bias voltage applied to at least one of the plus transistor or the minus transistor of the first stage of the mixer circuit based on the plus voltage and the minus voltage. For example, the controller circuitry 512 can adjust at least one bias voltage 408 applied to at least one of the plus transistor T+ or the minus transistor T− of the first stage 510-1 of the mixer circuit 130 based on the plus voltage V+ and the minus voltage V−. This may be performed by a state machine 512-2, for instance, to reduce a difference between the plus voltage V+ and the minus voltage V−. This can reduce a current offset of the mixer circuit 130 by adjusting the bias voltage 408 applied to at least one front-gate terminal or at least one back-gate terminal of the transconductance transistors of the first stage 510-1.

The operation(s) of the block 1012 may occur as part of a calibration mode. Subsequently, at least one stored tuning value, which is determined by the calibrating during the calibration mode, can be used in a mission mode. For example, the tuning value can be used to tune the mixer circuit 130. In some cases, the determined tuning value may be retrieved from one register and loaded into another register that is coupled to the tuning circuitry 134 or part thereof (e.g., part of the bias control circuitry 404). The tuning circuitry 134 can tune an operation of the mixer 132 during the mission mode using the retained tuning value that is produced during the calibration mode.

FIG. 10 is a flow diagram illustrating example processes or methods related to oscillator leakage calibration. The processes are described in the form of a set of blocks that specify operations that can be performed. However, operations are not necessarily limited to the order shown in the figures or described herein, for the operations may be implemented in alternative orders or in fully or partially overlapping manners. Also, more, fewer, and/or different operations may be implemented to perform a respective process or an alternative process. Operations represented by the illustrated blocks of each process may be performed by an electronic device, such as the electronic device 102 of FIG. 1 or the wireless interface device 120 thereof. More specifically, the operations of the respective processes may be performed by a mixer circuit 130 of a transceiver 126 or an RF front-end 128, in conjunction with other components such as calibration circuitry 138.

Implementation Examples

This section describes some aspects of example implementations and/or example configurations related to the apparatuses and/or processes presented above.

Example aspect 1: An apparatus comprising:

a mixer circuit comprising:
- a first stage comprising at least one transistor coupled between a mixer input and a mixer output;
- a second stage comprising one or more transistors coupled between the at least one transistor of the first stage and the mixer output, the one or more transistors coupled between a local oscillator signal input and the mixer output; and
- tuning circuitry coupled to the at least one transistor of the first stage; and calibration circuitry comprising:
- at least one resistor coupled between a power distribution node and at least one mixer node, the at least one mixer node coupled between the at least one transistor of the first stage and the one or more transistors of the second stage;
- at least one switch coupled between the power distribution node and the at least one mixer node; and
- controller circuitry coupled between the at least one mixer node and the tuning circuitry.

Example aspect 2: The apparatus of example aspect 1, wherein:
- the at least one switch is coupled in series with the at least one resistor between the power distribution node and the at least one mixer node; and
- the at least one switch is coupled between the at least one resistor and the at least one mixer node.

Example aspect 3: The apparatus of example aspect 2 or 3, wherein:
- the controller circuitry is coupled between the tuning circuitry and another node that is coupled between the at least one switch and the at least one resistor.

Example aspect 4: The apparatus of any one of the preceding example aspects, wherein:
- the controller circuitry comprises a comparator having a first input and a second input;
- the first input of the comparator is coupled to the at least one mixer node; and
- the second input of the comparator is coupled to a node configured to provide a reference voltage.

Example aspect 5: The apparatus of example aspect 4, wherein:

the comparator has an output coupled to the tuning circuitry; and the controller circuitry is configured to:

provide a control signal to the tuning circuitry; and adjust the control signal based on the reference voltage at the second input of the comparator and a voltage present at the first input of the comparator.

Example aspect 6: The apparatus of example aspect 5, wherein:

the controller circuitry is configured to adjust the control signal until the voltage present at the first input of the comparator is substantially equal to the reference voltage at the second input of the comparator; and the voltage present at the first input of the comparator represents a current flowing through the at least one transistor of the first stage of the mixer circuit.

Example aspect 7: The apparatus of example aspect 5 or 6, wherein:

the tuning circuitry comprises at least one bias voltage generator;

the at least one bias voltage generator is configured to apply at least one bias voltage to at least one gate of the at least one transistor of the first stage of the mixer circuit; and the controller circuitry is configured to adjust the control signal to change the at least one bias voltage applied by the at least one bias voltage generator to the at least one gate of the at least one transistor of the first stage of the mixer circuit.

Example aspect 8: The apparatus of example aspect 7, wherein:

the at least one transistor of the first stage of the mixer circuit comprises a plus transistor and a minus transistor of the first stage of the mixer circuit;

the at least one bias voltage comprises a plus bias voltage and a minus bias voltage;

the controller circuitry is configured to adjust the control signal to change the plus bias voltage based on a plus current flowing through the plus transistor; and the controller circuitry is configured to adjust the control signal to change the minus bias voltage based on a minus current flowing through the minus transistor.

Example aspect 9: The apparatus of any one of the preceding example aspects, wherein:

the at least one resistor comprises a plus resistor and a minus resistor.

Example aspect 10: The apparatus of example aspect 9, wherein:

the at least one transistor of the first stage of the mixer circuit comprises a plus transistor and a minus transistor; and the controller circuitry is configured to:

measure a plus voltage corresponding to the plus resistor and the plus transistor and a minus voltage corresponding to the minus resistor and the minus transistor;

provide a control signal to the tuning circuitry; and adjust the control signal based on the plus voltage and the minus voltage.

Example aspect 11: The apparatus of example aspect 10, wherein:

the plus voltage represents a plus current flowing through the plus transistor of the first stage of the mixer circuit, and the minus voltage represents a minus current flowing through the minus transistor of the first stage of the mixer circuit; and the controller circuitry is configured to adjust the control signal to reduce a difference between the plus voltage and the minus voltage.

Example aspect 12: The apparatus of any one of example aspects 9-11, wherein:

the controller circuitry comprises at least one analog-to-digital converter having at least one input, the at least one input of the analog-to-digital converter coupled to the plus resistor and the minus resistor.

Example aspect 13: The apparatus of any one of the preceding example aspects, wherein:

the tuning circuitry comprises at least one bias voltage generator;

the at least one transistor of the first stage comprises a gate terminal; and the at least one bias voltage generator of the tuning circuitry is coupled to the gate terminal of the at least one transistor of the first stage.

Example aspect 14: The apparatus of example aspect 13, wherein:

the gate terminal of the at least one transistor of the first stage comprises a front-gate terminal.

Example aspect 15: The apparatus of example aspect 13, wherein:

the gate terminal of the at least one transistor of the first stage comprises a back-gate terminal.

Example aspect 16: The apparatus of any one of the preceding example aspects, wherein:

the tuning circuitry comprises at least one bias voltage generator, the at least one bias voltage generator comprising:

one or more current sources coupled between first and second power distribution nodes; and one or more resistors coupled in series with the one or more current sources between the first and second power distribution nodes.

Example aspect 17: The apparatus of example aspect 16, wherein the one or more current sources comprise at least one adjustable current source.

Example aspect 18: The apparatus of example aspect 16 or 17, wherein the one or more resistors comprise at least one adjustable resistor.

Example aspect 19: The apparatus of any one of the preceding example aspects, wherein:

the at least one transistor of the first stage comprises a plus first transistor and a minus first transistor;

the one or more transistors of the second stage comprise a plus second transistor and a minus second transistor;

the at least one mixer node comprises a plus mixer node and a minus mixer node, the plus mixer node coupled between the plus first transistor and the plus second transistor, the minus mixer node coupled between the minus first transistor and the minus second transistor; and the at least one switch comprises a plus switch and a minus switch, the plus switch coupled in series with the at least one resistor between the power distribution node and the plus mixer node, the minus switch coupled in series with the at least one resistor between the power distribution node and the minus mixer node.

Example aspect 20: The apparatus of any one of the preceding example aspects, further comprising:

a wireless interface device comprising the mixer circuit and the calibration circuitry;

a display screen; and at least one processor operatively coupled to the display screen and at least a portion of the wireless interface device, the at least one processor configured to present one or more graphical images on the display screen based on one or more wireless signals communicated using the mixer circuit of the wireless interface device.

Example aspect 21: An apparatus comprising:

a mixer circuit comprising:

a first stage comprising at least one transistor coupled between a mixer input and a mixer output;

a second stage comprising one or more transistors coupled between the at least one transistor of the first stage and the mixer output; and means for tuning the at least one transistor of the first stage; and calibration circuitry comprising:

at least one resistor coupled between a power distribution node and at least one mixer node, the at least one mixer node coupled between the at least one transistor of the first stage and the one or more transistors of the second stage;

at least one switch coupled in series with the at least one resistor between the power distribution node and the at least one mixer node; and means for controlling the means for tuning based on at least one voltage associated with the at least one resistor.

Example aspect 22: The apparatus of example aspect 21, wherein:

the at least one transistor of the first stage comprises a plus transistor and a minus transistor;

the at least one voltage comprises a plus voltage corresponding to the plus transistor and a minus voltage corresponding to the minus transistor; and the means for controlling comprises means for controlling the means for tuning based on the plus voltage and the minus voltage.

Example aspect 23: The apparatus of example aspect 22, wherein:

the means for tuning comprises means for adjusting a plus bias voltage for the plus transistor and a minus bias voltage for the minus transistor; and the means for controlling comprises means for controlling the means for tuning to reduce a difference between the plus voltage and the minus voltage by adjusting the plus bias voltage for the plus transistor and the minus bias voltage for the minus transistor.

Example aspect 24: A method for mixer calibration, the method comprising:

closing a plus switch to connect at least one resistor to a plus mixer node coupled between a plus transistor of a first stage of a mixer circuit and a second stage of the mixer circuit;

measuring a plus voltage corresponding to the plus transistor of the first stage of the mixer circuit using the at least one resistor;

opening the plus switch to disconnect the at least one resistor from the plus mixer node;

closing a minus switch to connect the at least one resistor to a minus mixer node coupled between a minus transistor of the first stage of the mixer circuit and the second stage of the mixer circuit;

measuring a minus voltage corresponding to the minus transistor of the first stage of the mixer circuit using the at least one resistor; and adjusting at least one bias voltage applied to at least one of the plus transistor or the minus transistor of the first stage of the mixer circuit based on the plus voltage and the minus voltage.

Example aspect 25: The method of example aspect 24, wherein the adjusting comprises:

adjusting a plus bias voltage applied to the plus transistor and a minus bias voltage applied to the minus transistor to reduce a difference between the plus voltage and the minus voltage.

Example aspect 26: The method of example aspect 24 or 25, wherein the adjusting comprises:

adjusting the at least one bias voltage applied to at least one of the plus transistor or the minus transistor to reduce a current offset between a plus current flowing through the plus transistor and a minus current flowing through the minus transistor.

Example aspect 27: An apparatus comprising:

a communication chain comprising:

a mixer comprising:

a plus transistor comprising a plus channel terminal and a plus gate terminal; and a minus transistor comprising a minus channel terminal and a minus gate terminal;

at least one resistor;

a plus switch coupled in series with the at least one resistor between the plus channel terminal of the plus transistor and a power distribution node, a plus node coupled between the plus switch and the at least one resistor;

a minus switch coupled in series with the at least one resistor between the minus channel terminal of the minus transistor and the power distribution node, a minus node coupled between the minus switch and the at least one resistor;

at least one bias voltage generator coupled to the plus gate terminal of the plus transistor and the minus gate terminal of the minus transistor; and calibration circuitry coupled between the plus node and the at least one bias voltage generator and between the minus node and the at least one bias voltage generator.

Example aspect 28: The apparatus of example aspect 27, wherein:

the at least one resistor comprises a plus resistor and a minus resistor;

the plus switch is coupled in series with the plus resistor between the plus channel terminal of the plus transistor and the power distribution node; and the minus switch is coupled in series with the minus resistor between the minus channel terminal of the minus transistor and the power distribution node.

Example aspect 29: The apparatus of example aspect 27 or 28, wherein:

the plus gate terminal of the plus transistor comprises a plus back-gate terminal of the plus transistor; and the minus gate terminal of the minus transistor comprises a minus back-gate terminal of the minus transistor.

Example aspect 30: The apparatus of any one of example aspects 27-29, wherein:

the calibration circuitry comprises at least one comparator having at least one input;

the plus node and the minus node comprise a common node; and the at least one input of the at least one comparator is coupled to the common node.

Conclusion

As used herein, the terms “couple,” “coupled,” or “coupling” refer to a relationship between two or more components that are in operative communication with each other to implement some feature or realize some capability that is described herein. The coupling can be realized using, for instance, a physical line, such as a metal trace or wire, or an electromagnetic coupling, such as with a transformer. A coupling can include a direct coupling or an indirect coupling. A direct coupling refers to connecting discrete circuit elements via a same node without an intervening element. An indirect coupling refers to connecting discrete circuit elements via one or more other devices or other discrete circuit elements, including two or more different nodes.

The term “node” (e.g., including a “first node” or a “mixer node”) represents at least a point of electrical connection between two or more components (e.g., circuit elements). Although at times a node may be visually depicted in a drawing as a single point, the node can represent a connection portion of a physical circuit or network that has approximately a same voltage potential at or along the connection portion between two or more components. In other words, a node can represent at least one of multiple points along a conducting medium (e.g., a wire or trace) that exists between electrically connected components. Similarly, a “terminal” or “port” may represent one or more points with at least approximately a same voltage potential relative to an input or output of a component (e.g., a transistor).

The terms “first,” “second,” “third,” and other numeric-related indicators are used herein to identify or distinguish similar or analogous items from one another within a given context—such as a particular implementation, a single drawing figure, a given component, or a claim. Thus, a first item in one context may differ from a first item in another context. For example, an item identified as a “first node” in one context may be identified as a “second node” in another context. Similarly, a “first resistor” or a “first switch” in one claim may be recited as a “second resistor” or a “third switch,” respectively, in a different claim (e.g., in separate claim sets). An analogous interpretation applies to differential-related terms such as a “plus resistor” and a “minus resistor” or a “plus voltage” and a “minus voltage.”

Unless context dictates otherwise, use herein of the word “or” may be considered use of an “inclusive or,” or a term that permits inclusion or application of one or more items that are linked by the word “or” (e.g., a phrase “A or B” may be interpreted as permitting just “A,” as permitting just “B,” or as permitting both “A” and “B”). Also, as used herein, a phrase referring to “at least one of” a list of items refers to any combination of those items, including single members. For instance, “at least one of a, b, or c” can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations for oscillator leakage calibration have been described in language specific to certain features and/or methods, the subject of the appended claims is not necessarily limited to the specific features or methods described. Rather, the specific features and methods are disclosed as example implementations for oscillator leakage calibration.

What is claimed is:

1. An apparatus comprising:

a mixer circuit comprising:

a first stage comprising at least one transistor coupled between a mixer input and a mixer output;

a second stage comprising one or more transistors coupled between the at least one transistor of the first stage and the mixer output, the one or more transistors coupled between a local oscillator signal input and the mixer output; and tuning circuitry coupled to the at least one transistor of the first stage; and calibration circuitry comprising:

at least one resistor coupled between a power distribution node and at least one mixer node, the at least one mixer node coupled between the at least one transistor of the first stage and the one or more transistors of the second stage;

at least one switch coupled between the power distribution node and the at least one mixer node; and controller circuitry coupled between the at least one mixer node and the tuning circuitry, wherein the controller circuitry comprises a comparator having a first input and a second input, wherein the first input of the comparator is coupled to the at least one mixer node and the second input of the comparator is coupled to a node configured to provide a reference voltage.

2. The apparatus of claim 1, wherein:

the at least one switch is coupled in series with the at least one resistor between the power distribution node and the at least one mixer node; and the at least one switch is coupled between the at least one resistor and the at least one mixer node.

3. The apparatus of claim 2, wherein:

the controller circuitry is coupled between the tuning circuitry and another node that is coupled between the at least one switch and the at least one resistor.

4. The apparatus of claim 1, wherein:

the comparator has an output coupled to the tuning circuitry; and the controller circuitry is configured to:

provide a control signal to the tuning circuitry; and adjust the control signal based on the reference voltage at the second input of the comparator and a voltage present at the first input of the comparator.

5. The apparatus of claim 4, wherein:

the controller circuitry is configured to adjust the control signal until the voltage present at the first input of the comparator is substantially equal to the reference voltage at the second input of the comparator; and the voltage present at the first input of the comparator represents a current flowing through the at least one transistor of the first stage of the mixer circuit.

6. The apparatus of claim 4, wherein:

the tuning circuitry comprises at least one bias voltage generator;

the at least one bias voltage generator is configured to apply at least one bias voltage to at least one gate of the at least one transistor of the first stage of the mixer circuit; and the controller circuitry is configured to adjust the control signal to change the at least one bias voltage applied by the at least one bias voltage generator to the at least one gate of the at least one transistor of the first stage of the mixer circuit.

7. The apparatus of claim 6, wherein:

the at least one transistor of the first stage of the mixer circuit comprises a plus transistor and a minus transistor of the first stage of the mixer circuit;

the at least one bias voltage comprises a plus bias voltage and a minus bias voltage;

the controller circuitry is configured to adjust the control signal to change the plus bias voltage based on a plus current flowing through the plus transistor; and the controller circuitry is configured to adjust the control signal to change the minus bias voltage based on a minus current flowing through the minus transistor.

8. The apparatus of claim 1, wherein:

the at least one resistor comprises a plus resistor and a minus resistor.

9. The apparatus of claim 8, wherein:

the at least one transistor of the first stage of the mixer circuit comprises a plus transistor and a minus transistor; and the controller circuitry is configured to:

measure a plus voltage corresponding to the plus resistor and the plus transistor and a minus voltage corresponding to the minus resistor and the minus transistor;

provide a control signal to the tuning circuitry; and adjust the control signal based on the plus voltage and the minus voltage.

10. The apparatus of claim 9, wherein:

the plus voltage represents a plus current flowing through the plus transistor of the first stage of the mixer circuit, and the minus voltage represents a minus current flowing through the minus transistor of the first stage of the mixer circuit; and the controller circuitry is configured to adjust the control signal to reduce a difference between the plus voltage and the minus voltage.

11. The apparatus of claim 8, wherein:

the controller circuitry comprises at least one analog-to-digital converter having at least one input, the at least one input of the analog-to-digital converter coupled to the plus resistor and the minus resistor.

12. The apparatus of claim 1, wherein:

the tuning circuitry comprises at least one bias voltage generator;

the at least one transistor of the first stage comprises a gate terminal; and the at least one bias voltage generator of the tuning circuitry is coupled to the gate terminal of the at least one transistor of the first stage.

13. The apparatus of claim 12, wherein:

the gate terminal of the at least one transistor of the first stage comprises a front-gate terminal.

14. The apparatus of claim 12, wherein:

the gate terminal of the at least one transistor of the first stage comprises a back-gate terminal.

15. The apparatus of claim 1, wherein:

the tuning circuitry comprises at least one bias voltage generator, the at least one bias voltage generator comprising:

one or more current sources coupled between first and second power distribution nodes; and one or more resistors coupled in series with the one or more current sources between the first and second power distribution nodes.

16. The apparatus of claim 15, wherein the one or more current sources comprise at least one adjustable current source.

17. The apparatus of claim 15, wherein the one or more resistors comprise at least one adjustable resistor.

18. The apparatus of claim 1, wherein:

the at least one transistor of the first stage comprises a plus first transistor and a minus first transistor;

the one or more transistors of the second stage comprise a plus second transistor and a minus second transistor;

the at least one mixer node comprises a plus mixer node and a minus mixer node, the plus mixer node coupled between the plus first transistor and the plus second transistor, the minus mixer node coupled between the minus first transistor and the minus second transistor; and the at least one switch comprises a plus switch and a minus switch, the plus switch coupled in series with the at least one resistor between the power distribution node and the plus mixer node, the minus switch coupled in series with the at least one resistor between the power distribution node and the minus mixer node.

19. The apparatus of claim 1, further comprising:

a wireless interface device comprising the mixer circuit and the calibration circuitry;

a display screen; and at least one processor operatively coupled to the display screen and at least a portion of the wireless interface device, the at least one processor configured to present one or more graphical images on the display screen based on one or more wireless signals communicated using the mixer circuit of the wireless interface device.

20. An apparatus comprising:

a mixer circuit comprising:

a first stage comprising at least one transistor coupled between a mixer input and a mixer output;

a second stage comprising one or more transistors coupled between the at least one transistor of the first stage and the mixer output; and tuning circuitry coupled to the at least one transistor of the first stage; and calibration circuitry comprising:

at least one resistor coupled between a power distribution node and at least one mixer node, the at least one mixer node coupled between the at least one transistor of the first stage and the one or more transistors of the second stage;

at least one switch coupled in series with the at least one resistor between the power distribution node and the at least one mixer node; and controller circuitry coupled between the at least one mixer node and the tuning circuitry, wherein the tuning circuitry comprises at least one bias voltage generator, the at least one transistor of the first stage comprises a gate terminal, and the at least one bias voltage generator of the tuning circuitry is coupled to the gate terminal of the at least one transistor of the first stage.

21. An apparatus comprising:

a mixer circuit comprising:

a first stage comprising at least one transistor coupled between a mixer input and a mixer output;

a second stage comprising one or more transistors coupled between the at least one transistor of the first stage and the mixer output, the one or more transistors coupled between a local oscillator signal input and the mixer output; and tuning circuitry coupled to the at least one transistor of the first stage; and calibration circuitry comprising:

at least one resistor coupled between a power distribution node and at least one mixer node, the at least one mixer node coupled between the at least one transistor of the first stage and the one or more transistors of the second stage;

at least one switch coupled between the power distribution node and the at least one mixer node; and controller circuitry coupled between the at least one mixer node and the tuning circuitry, wherein the at least one transistor of the first stage comprises a plus first transistor and a minus first transistor;

wherein the one or more transistors of the second stage comprise a plus second transistor and a minus second transistor;

wherein the at least one mixer node comprises a plus mixer node and a minus mixer node, the plus mixer node coupled between the plus first transistor and the plus second transistor, the minus mixer node coupled between the minus first transistor and the minus second transistor; and wherein the at least one switch comprises a plus switch and a minus switch, the plus switch coupled in series with the at least one resistor between the power distribution node and the plus mixer node, the minus switch coupled in series with the at least one resistor between the power distribution node and the minus mixer node.

* * * * *